(12) United States Patent
Tushar et al.

(10) Patent No.: US 10,178,684 B2
(45) Date of Patent: Jan. 8, 2019

(54) DEVICE AND METHOD FOR SCHEDULING MACHINE-TO-MACHINE COMMUNICATION SYSTEM

(71) Applicant: Samsung Electronics Co., Ltd., Suwon-si, Gyeonggi-do (KR)

(72) Inventors: Vrind Tushar, Bangalore (IN); Diwakar Sharma, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/326,944

(22) PCT Filed: Jul. 16, 2015

(86) PCT No.: PCT/KR2015/007411
§ 371 (c)(1),
(2) Date: Jan. 17, 2017

(87) PCT Pub. No.: WO2016/010385
PCT Pub. Date: Jan. 21, 2016

(65) Prior Publication Data
US 2017/0208612 A1     Jul. 20, 2017

(30) Foreign Application Priority Data
Jul. 16, 2014     (KR) .......................... 10-2014-0089869

(51) Int. Cl.
*H04W 72/12*     (2009.01)
*H04W 88/08*     (2009.01)
(Continued)

(52) U.S. Cl.
CPC ....... *H04W 72/1226* (2013.01); *H04L 5/0048* (2013.01); *H04L 5/0082* (2013.01);
(Continued)

(58) Field of Classification Search
CPC . H04W 4/005; H04W 72/1226; H04W 72/14; H04W 84/18; H04W 88/08; H04L 5/0048
See application file for complete search history.

(56) References Cited

U.S. PATENT DOCUMENTS

| | | |
|---|---|---|
| 2007/0091889 A1 | 4/2007 | Xiao et al. |
| 2011/0107169 A1* | 5/2011 | Lohr ................... H04W 72/042 714/748 |

(Continued)

FOREIGN PATENT DOCUMENTS

| | | |
|---|---|---|
| KR | 10-2013-0007198 A | 1/2013 |
| WO | 2013/131264 A1 | 9/2013 |

OTHER PUBLICATIONS

3rd Generation Partnership Project, "Technical Specification Group Services and System Aspects; Feasibility study for Proximity Services (ProSe)", Jun. 2016, pp. 1-45, Release 12, TR22.803 V12.2.0, 650 Route des Lucioles—Sophia Antipolis Valbonne—France.

(Continued)

*Primary Examiner* — Dung B Huynh
(74) *Attorney, Agent, or Firm* — Jefferson IP Law, LLP

(57) ABSTRACT

The present disclosure relates to a technology for a sensor network, a machine-to-machine (M2M) communication, machine type communication (MTC), and the Internet of things (IoT). The present disclosure can be utilized for the intelligent service (a smart home, a smart building, a smart city, a smart car or a connected car, healthcare, digital education, a retail business, a security and safety-related service or the like) on the basis of the technology. Embodiments of the present invention provide a device and a method for minimizing an overhead of a mobile communication network in a machine type communication (MTC) system and minimizing power consumption in devices for MTC. According to an embodiment of the present invention, a base station device of a mobile communication network (Continued)

for M2M communication comprises: a transceiver for transmitting and receiving a signal to/from a leader device among a plurality of devices for M2M communication; and a control unit for transmitting, to the reader device, a downlink control signal through the transceiver in at least one predetermined interval within a scheduling interval and receiving, from the reader device, an uplink signal through the transceiver at a specific time point determined from the predetermined interval within the scheduling interval.

17 Claims, 19 Drawing Sheets

(51) Int. Cl.
   *H04W 4/70* (2018.01)
   *H04L 5/00* (2006.01)
   *H04W 72/14* (2009.01)
   *H04W 84/18* (2009.01)

(52) U.S. Cl.
   CPC ............. *H04L 5/0094* (2013.01); *H04W 4/70* (2018.02); *H04W 72/14* (2013.01); *H04W 88/08* (2013.01); *H04W 72/121* (2013.01); *H04W 84/18* (2013.01); *Y02D 70/00* (2018.01); *Y02D 70/1262* (2018.01); *Y02D 70/21* (2018.01); *Y02D 70/23* (2018.01); *Y02D 70/24* (2018.01)

(56) References Cited

U.S. PATENT DOCUMENTS

| | | | |
|---|---|---|---|
| 2012/0033613 A1 | 2/2012 | Lin et al. | |
| 2012/0093098 A1 | 4/2012 | Charbit et al. | |
| 2012/0142268 A1* | 6/2012 | Tao | H04W 4/08 455/3.05 |
| 2013/0029716 A1* | 1/2013 | Lee | H04W 4/005 455/519 |
| 2013/0046983 A1* | 2/2013 | Zhu | H04L 63/065 713/171 |
| 2013/0136072 A1 | 5/2013 | Bachmann et al. | |
| 2013/0343265 A1* | 12/2013 | Ehsan | H04J 3/0632 370/328 |
| 2014/0066001 A1 | 3/2014 | Lee | |
| 2014/0078945 A1* | 3/2014 | Schwartz | H04W 52/0216 370/311 |
| 2014/0092833 A1* | 4/2014 | Vannithamby | H04W 52/0258 370/329 |
| 2014/0126458 A1 | 5/2014 | Cho et al. | |
| 2014/0126492 A1* | 5/2014 | Gleixner | H04W 72/04 370/329 |
| 2014/0313908 A1* | 10/2014 | da Silva | H04W 4/005 370/252 |
| 2015/0237649 A1* | 8/2015 | Zhang | H04W 4/70 370/329 |
| 2015/0358996 A1* | 12/2015 | Fang | H04W 74/04 370/280 |

OTHER PUBLICATIONS

3rd Generation Partnership Project, Technical Specification Group Services and System Aspects; Study on enhancements for Machine-Type Communications (MTC), Mar. 2013, pp. 1-22, Release 12, TR22.888 V12.0.0, 650 Route des Lucioles—Sophia Antipolis Valbonne—France.

3rd Generation Partnership Project, "Technical Specification Group Services and System Aspects; System improvements for Machine-Type Communications (MTC)", pp. 1-165, Release 11, Sep. 2012, TR23.888 V11.0.0, 650 Route des Lucioles—Sophia Antipolis Valbonne—France.

3rd Generation Partnership Project, "Technical Specification Group Radio Access Network; Study on Enhancements to Machine-Type Communications (MTC) and other Mobile Data Applications; Radio Access Network (RAN) aspects", Sep. 2013, pp. 1-43, Release 12, TR37.869, 650 Route des Lucioles—Sophia Antipolis Valbonne—France.

3rd Generation Partnership Project, "Technical Specification Group Radio Access Network; Evolved Universal Terrestrial Radio Access (E-UTRA); Medium Access Control (MAC) protocol specification", Jun. 2011, pp. 1-54, Release 10, TS36.321 V10.2.0, 650 Route des Lucioles—Sophia Antipolis Valbonne—France.

Jim Morrish and Matt Hatton, "Global connected devices to exceed 24 billion in 2020, generating EUR1.3 trillion in data revenue according to new research from Machina Research", Oct. 11, 2011, pp. 1-3, London, UK.

* cited by examiner

DEVICE AND METHOD FOR SCHEDULING MACHINE-TO-MACHINE COMMUNICATION SYSTEM

CROSS-REFERENCE TO RELATED APPLICATION(S)

This application is a U.S. National Stage application under 35 U.S.C. § 371 of an International application filed on Jul. 16, 2015 and assigned application number PCT/KR2015/007411, which claimed the benefit of a Korean patent application filed on Jul. 16, 2014 in the Korean Intellectual Property Office and assigned Serial number 10-2014-0089869, the entire disclosure of which is hereby incorporated by reference.

TECHNICAL FIELD

The present disclosure relates to a Machine to Machine communication.

BACKGROUND ART

The Internet is evolving from a human-oriented connection network, in which humans generate and consume information, to the Internet of Things (IoT) network, in which distributed elements, such as things and the like, exchange and process information. Internet of Everything (IoE) technology, in which a big data processing technology through a connection with a cloud server, etc. is combined with the IoT technology, is also emerging. In order to implement the IoT, technical factors such as a sensing technique, wired/wireless communication, network infrastructure, service interface technology, and security technology are required, and thus technologies such as a sensor network, Machine to Machine (M2M), Machine Type Communication (MTC), and the like for a connection between objects have recently been researched.

In an IoT environment, through collection and analysis of data generated in connected objects, an intelligent Internet Technology (IT) service to create a new value for the human's life may be provided. The IoT may be applied to fields, such as a smart home, smart building, smart city, smart car or connected car, smart grid, health care, smart home appliance, or high-tech medical service, through the convergence of the conventional Information Technology (IT) and various industries.

Machine to Machine (M2M) or Machine Type Communication (MTC) (hereinafter, collectively referred to as "MTC") refers to communication between a device and an object based on a mobile communication network without human intervention. Such MTC is expected to be used in a plurality of devices in sectors such as intelligent environments, intelligent living, and intelligent enterprises.

DETAILED DESCRIPTION OF THE INVENTION

Technical Problem

Accordingly, embodiments of the present disclosure are intended to provide a device and method for minimizing overhead in a mobile communication network such as a Radio Access Network (RAN) in an MTC system.

Embodiments of the present disclosure are intended to provide a device and method for minimizing power consumption in devices for MTC in an MTC system.

Technical Solution

According to an embodiment of the present disclosure, a base station device of a mobile communication network for MTC includes: a transceiver configured to transmit or receive a signal to or from a leader device among a plurality of devices for MTC; and a control unit configured to transmit a downlink control signal to the leader device through the transceiver in at least one assignment interval within a scheduling interval, and receive an uplink signal from the leader device through the transceiver at a specific time point determined from the assignment interval within the scheduling interval.

According to another embodiment, one device among a plurality of devices in a mobile communication network for MTC includes: a transceiver configured to transmit or receive a signal to or from a base station; and a control unit configured to receive a downlink control signal from the base station through the transceiver at least one assignment interval within a scheduling interval, and transmit an uplink signal to the base station through the transceiver at a specific time point determined from the assignment interval within the scheduling interval.

According to still another embodiment of the present disclosure, an operation method of a base station in a mobile communication network for MTC includes: transmitting, through a transceiver, a downlink control signal to at least one leader device among a plurality of devices for MTC in at least one assignment interval within a scheduling interval; and receiving an uplink signal from the leader device at a specific time point determined from the assignment interval within the scheduling interval.

According to still another embodiment, an operation method of one device among a plurality of devices in a mobile communication network for MTC includes: receiving a downlink control signal from a base station in at least one assignment interval within a scheduling interval; and transmitting an uplink signal to the base station at a specific time point determined from the assignment interval within the scheduling interval.

Advantageous Effects

According to embodiments of the present disclosure, a base station of a mobile communication network for MTC and a leader device (or an MTC gateway) of multiple devices can minimize the overhead of signal transmission or reception by transmitting or receiving a signal only at a specific time point, and can also minimize power consumption in the devices.

BRIEF DESCRIPTION OF THE DRAWINGS

The following description is made with reference to the accompanying drawings for a more complete understanding of the present disclosure and effects thereof, and the same reference numerals indicate the same parts.

MODE FOR CARRYING OUT THE INVENTION

Figure 1:
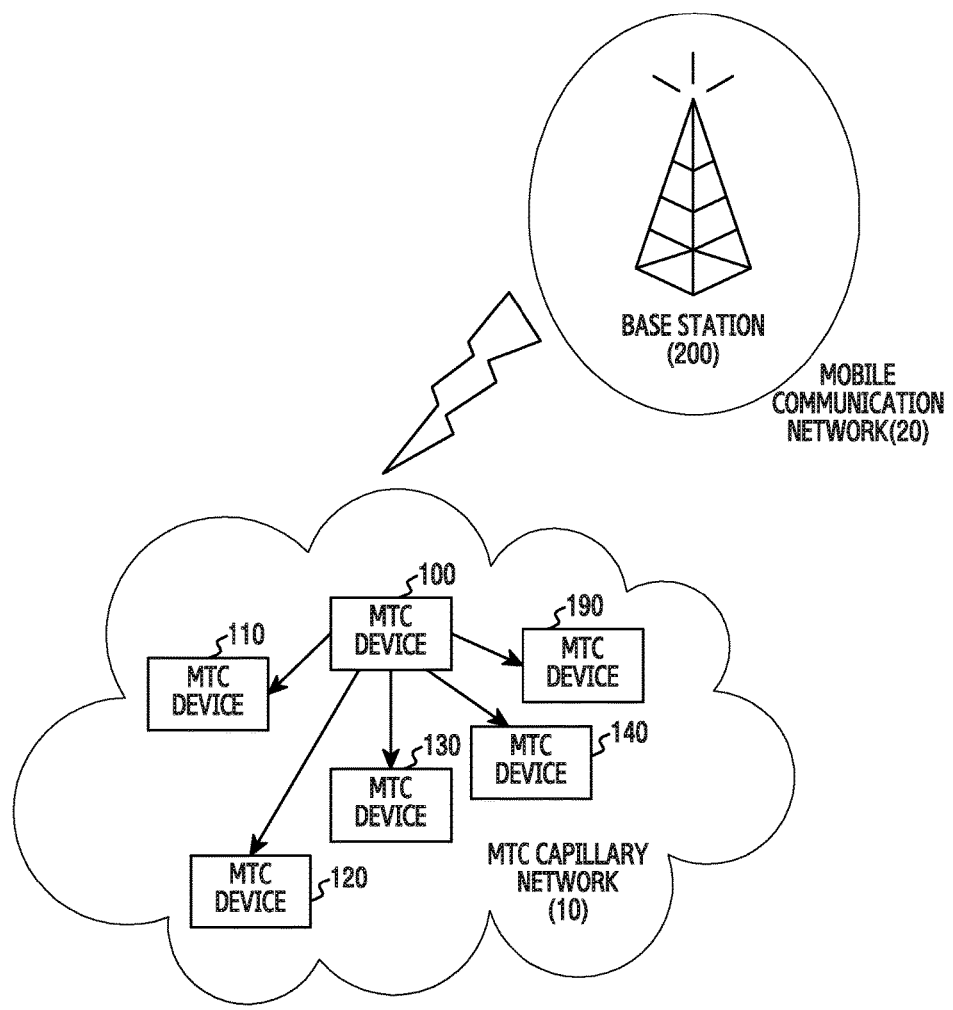
FIG. 1 is a diagram illustrating a configuration of an MTC capillary network based on a mobile communication network to which embodiments of the present disclosure are applied.

In this patent specification, FIGS. 1 to 16 used for describing principles of the present disclosure are merely for examples and should not be interpreted to limit the scope of the present disclosure.

Embodiments of the present disclosure, which will be described below, relate to MTC that may be used for industrial or domestic automation. The MTC may be based on a cellular communication system such as LTE, and MTC devices communicate with an MTC server via a wireless link and a core network. The MTC devices according to embodiments of the present disclosure may be a standalone-type MTC User Equipment (UE), or a legacy UE having an MTC supporting function that supports both MTC and R12 UEs for specific scenarios. In the following, MTC devices may be conveniently referred to as UEs.

First, embodiments of the present disclosure attempt to minimize an RACH overload scenario by using the fact that MTC devices mitigate constraints for scheduling. Embodiments of the present disclosure define a new "lazy/snooze State" for MTC devices instead of an idle state. In this state, the MTC devices are connected for a UL/DL operation.

In addition, according to embodiments of the present disclosure, it is assumed that only an MTC gateway is connected with a base station, and sleepy connectivity is defined. Here, a UE is synchronized with the base station by a Lean Sounding Reference Signal (SRS) and a timing alignment command Timing advance is calculated based on the Lean SRS. Uplink (UL) Semi Persistence Scheduling (SPS) is defined. Here, it is assumed that SPS assignment is performed in a large interval. Since timing alignment may not be maintained by a PUSCH, the UE transmits the Lean SRS such that the base station may measure timing alignment and maintain a synchronization state with the MTC gateway.

In addition, according to embodiments of the present disclosure, since DL SPS and an allocation interval are known and the UE is in a downlink synchronization state, the base station needs to know broadband and sub-band Channel Quality Indicator (CQI) information in order to schedule physical resources to the MTC gateway. Since the start interval of a DL SPS interval may be known, the UE measures an RS-defined subframe before deriving CQI for the base station, which is to be transmitted through the UL. Accordingly, the base station may schedule resources on the downlink.

Further, according to embodiments of the present disclosure, UL allocation, CQI, Lean SRS feedback may be transmitted from an uplink for a capillary network led by the MTC gateway. Similarly, in relation to the downlink, DL allocation and timing alignment (TA) may be transmitted from a downlink for a group led by the MTC gateway.

Further, according to embodiments of the present disclosure, MTC devices are connected with the MTC gateway, and only the MTC gateway is connected with the base station.

Hereinafter, definitions of major terms referred to in describing embodiments of the present disclosure are shown in TABLE 1 below.

TABLE 1

3GPP: 3rd Generation Partnership Project
CSI: Channel State Information
CQI: Channel Quality Information
D2D: Device to Device
DCI: Downlink Control Indicator
DL: Downlink
DRX: Discontinuous Reception
eNB: Evolved Node B
LTE: Long Term Evolution
MAC PDU: Medium Access Control Packet Data Unit
MTC: Mobile Type Communication
PDCCH: Physical Downlink Common Control Channel
PDSCH: Physical Downlink Shared Channel
PUCCH: Physical Uplink Common Control Channel
PUSCH: Physical Uplink Shared Channel
QoS: Quality of Service
RACH: Random Access Channel
RAN: Radio Access Network
RNTI: Radio Network Temporary Identifier
RRC: Radio Resource Control
SFN: Sub Frame Number
SINR: Signal to Interference plus Noise Ratio
SPS: Semi Persistent Scheduling
SRS: Sounding Reference Signal
TA COMM: Timing Alignment Command
UE: User Equipment
UL: Uplink FIG. 1 is a diagram illustrating a configuration of an MTC capillary network based on a mobile communication network to which embodiments of the present disclosure are applied.

Referring to FIG. 1, an MTC capillary network 10 includes a plurality of MTC devices 100, 110, 120, 130, 140, and 190. The MTC capillary network 10 is connected to an MTC server (not illustrated) based on a mobile communication network 20. In an embodiment, the mobile communication network 20 may be an LTE communication network. The mobile communication network 20 includes a Radio Access Network (RAN) such as a base station (evolved Node B (eNB)) 200 and a core network (not illustrated). The plurality of MTC devices 100-190 communicate through a Device to Device (D2D) link. One MTC device 100 among the MTC devices 100-190 is selected as an MTC Gateway (GW) or a leader MTC device. Access to the base station 200 is available through the MTC device 100.

MTC traffic has the characteristics of a small amount of data and inter-arrival time between seconds and many hours.

In terms of the power consumption of a device, the use of a traditional random access mechanism is a huge burden on the device because open loop power control and associated contention and back-off are major limiting factors.

Data needs to be delay tolerant or classified based on the frequency of use.

MTC devices may be classified as mobile, static, and semi-static in terms of mobility. For example, mobile MTC devices include sensors connected to transport devices. Static MTC devices include home/office entities that collect environmental metrics. Semi-static MTC devices include devices moving at a slow rate or limitedly traveling within known areas such as human body area sensors.

In the case of static or semi-static devices, a capillary network is formed through D2D discovery and association, and the MTC gateway communicates with the RAN. Accordingly, power consumption may be reduced.

The MTC devices may be categorized according to data characteristics such as delay tolerance and inter-packet transmission times. For example, the MTC devices may be categorized within predefined threshold values, using, for example, delay tolerance and inter-packet transmission times. The delay tolerance may have a class similar to background, real-time, interactive, etc., in terms of a QoS. Many threshold values may be defined with respect to the delay tolerance. The inter-packet transmission times may have a class based on, for example, large and small events.

The MTC capillary network 10 may be configured by the MTC devices 100 and 110-190 having an identical threshold value. Such additional information may be exchanged during D2D service discovery for configuring association. In an embodiment, an MTC indicator and a delay threshold value may be exchanged during the D2D discovery.

The MTC devices 110-190 select the MTC gateway 100 as a node that provides them with the best communication service to the base station 200. In an embodiment, the MTC gateway 100 may be selected as a leader node through round-robin capillary network self-organizing and/or features including a processing power and an aspect of position, such as being static for a long time. In another embodiment, the MTC devices 110-190 may select the MTC gateway 100 based on selection criteria such as a received Signal to Interference plus Noise Ratio (SINR), power sources, and mobility.

The MTC devices 110-190 communicate with the base station 200 via the MTC gateway 100 as a single communication node. The MTC devices 110-190 communicate with the MTC gateway 100. In an embodiment, the MTC devices 110-190 communicate with the MTC gateway 100 using LTE-based D2D. In another embodiment, the MTC devices 110-190 communicate with the MTC gateway 100 using short-range communication.

The MTC devices 110-190 do not have a direct connection with the base station 200. Therefore, the MTC devices 110-190 request, to the MTC gateway 100, UL/DL physical resources for communication. The MTC gateway 100 requests DL/UL physical resources for respective MTC devices 110-190 to the base station 200 in turn. The MTC gateway 100 communicates with the base station 200 on behalf of the MTC device and a group of the MTC devices for the efficient use of a spectrum for MTC communication.

Figure 2A:
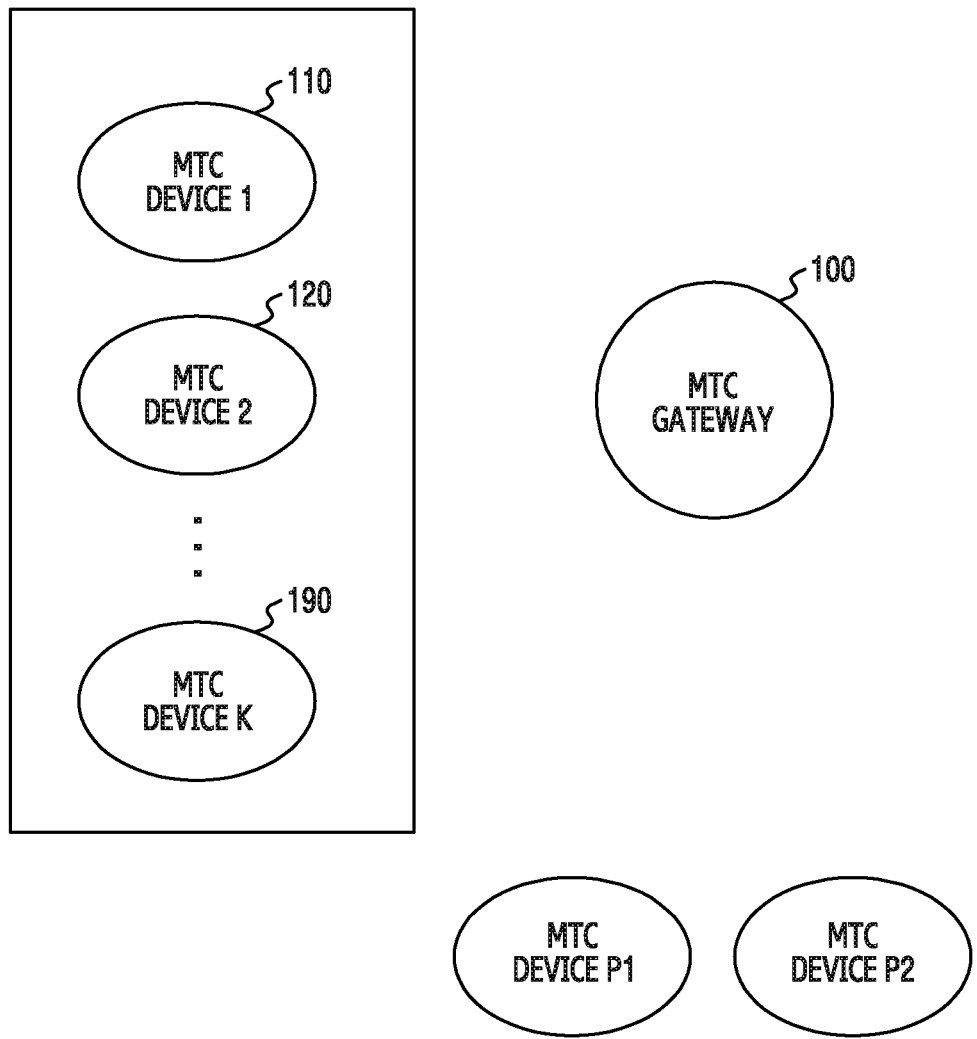
FIG. 2A and FIG. 2B are diagrams illustrating configurations of MTC capillary networks according to embodiments of the present disclosure.
Figure 2B:
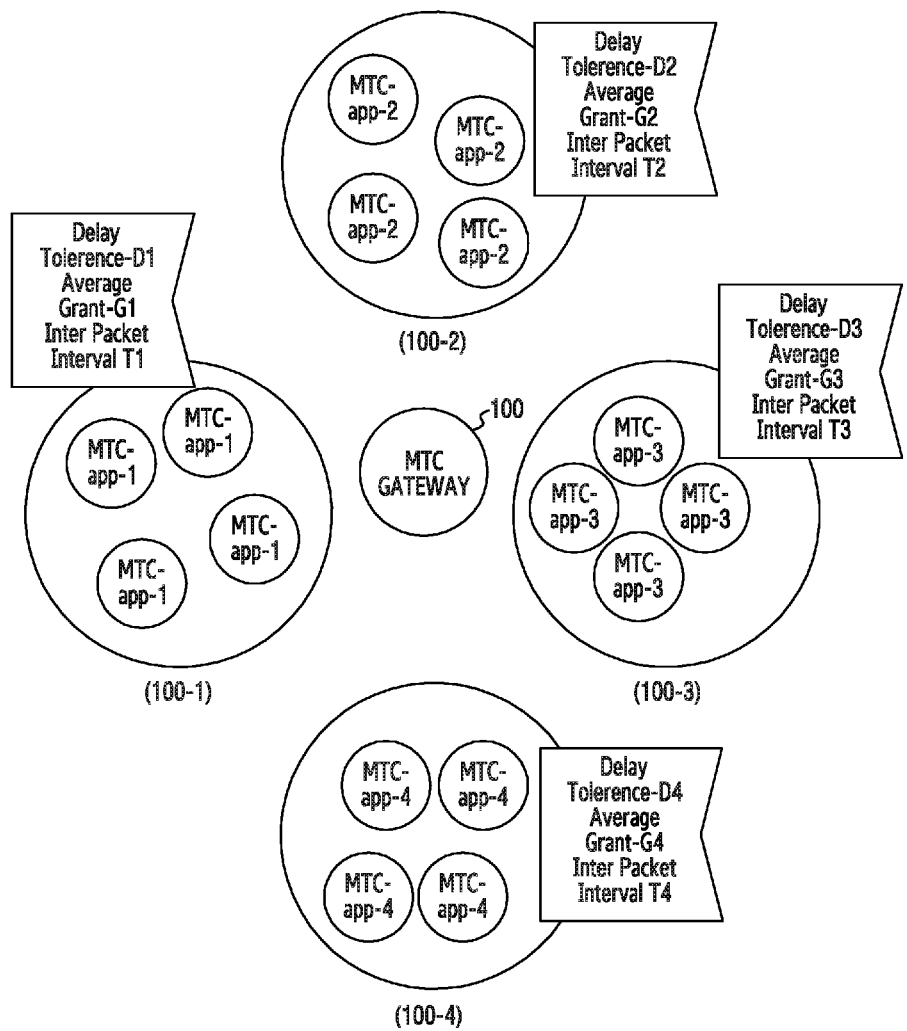

FIG. 2A and FIG. 2B are diagrams illustrating configurations of MTC capillary networks according to embodiments of the present disclosure.

Referring to FIG. 2A, a group of homogeneous MTC devices 110-190 and the MTC gateway 100 constitute the MTC capillary network. In an embodiment, a group of the MTC devices 110-190 and the MTC gateway 100 have almost the same Quality of Service (QoS) and delay tolerance as requirements for MTC. MTC device P1 and MTC device P2 may constitute another MTC capillary network or another group of MTC capillary networks.

Referring to FIG. 2B, MTC application devices are grouped into heterogeneous and homogeneous devices according to their nature.

Each of homogeneous MTC application devices 100-1, 100-2, 100-3, and 100-4 has almost the same QoS and a delay tolerance condition for MTC communication. For example, the MTC application devices 100-1 have a delay tolerance of D1, an average grant of G1, and an inter-packet interval of T1. The MTC application devices 100-2 have a delay tolerance of D2, an average grant of G2, and an inter-packet interval of T2. The MTC application devices 100-3 have a delay tolerance of D3, an average grant of G3, and inter-packet interval of T3. The MTC application devices 100-4 have a delay tolerance of D4, an average grant of G4, and an inter-packet interval of T4.

Heterogeneous MTC application devices 100-1, 100-2, 100-3 and 100-4 have different QoSes and delay tolerances based on grouping of different MTC application devices.

In the arrangement of MTC capillary networks, a homogeneous MTC device group or an MTC application device group may provide more opportunities for optimization. This is because scheduling is relatively easy for homogeneous MTC application devices, based on the nature of similar DL/UL grants and delay tolerances for all MTC devices in the same MTC capillary network.

MTC application-based communication is inherently impulsive and bursty. Therefore, for each MTC application burst, the MTC gateway needs to establish a radio link access with the base station for each MTC application device and all MTC application devices. Since a UL synchronization operation follows an open loop power control mechanism, in which feedback or previous information for initial transmission power is not known, the synchronization operation is limited in terms of power. This limit may consume most of the benefits generated by the MTC capillary network.

Thus, embodiments of the present disclosure propose a new MTC state, i.e. "a lazy/snooze state". In this lazy/snooze state, MTC devices may be synchronized with the base station through very basic communication, and may receive DL data and transmit UL data according to MTC device scheduling, while generally maintaining "lazy".

In a lazy/snooze state according to embodiments of the present disclosure, following operations are performed.

First, sub-persistence DL/UL allocations having very large intervals and allocation instances are allocated to the MTC devices.

Second, the MTC gateway may be audible only when DL SPS allocation is performed, and performs transmission only when UL allocation is performed.

Third, MTC gateway devices maintain Lean SRS transmission only for the purpose of maintaining MTC gateway UL synchronization.

Fourth, since a DL SPS scheduling interval is known in advance, the UE may measure channel state information for N subframes before DL allocation according to the DL SPS scheduling interval. The N subframes are the minimum number of frames for deriving CSI from averaged reference signal measurement values.

Figure 3A:
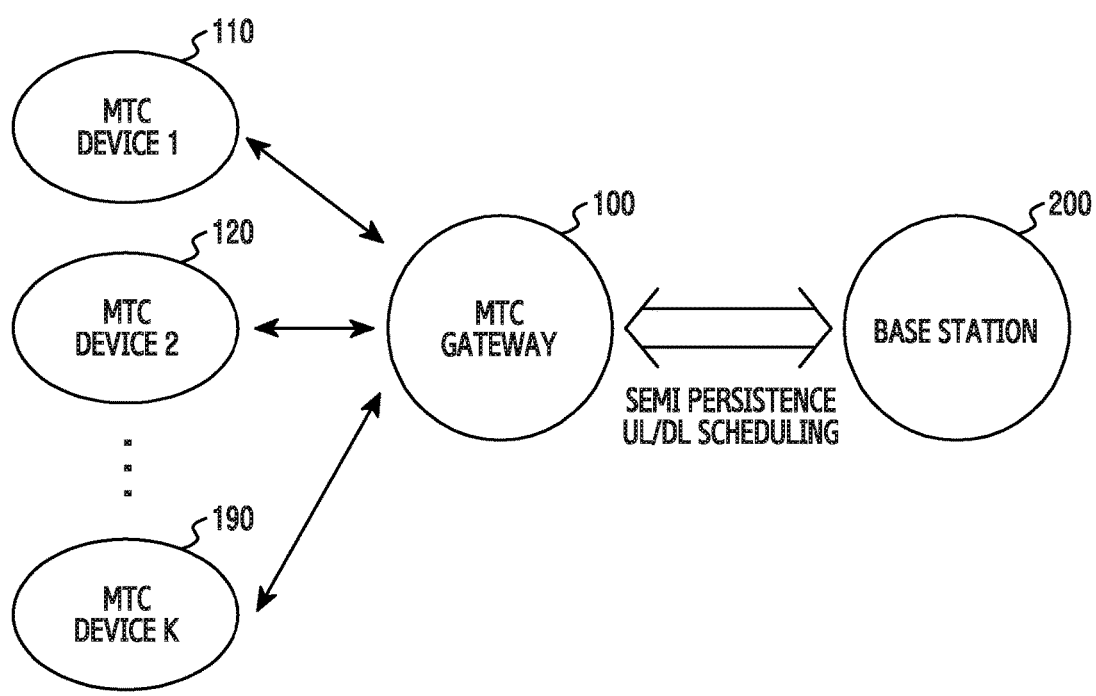
FIG. 3A to FIG. 3C are diagrams illustrating a configuration of a scheduling device by an MTC capillary network according to embodiments of the present disclosure.
Figure 3B:
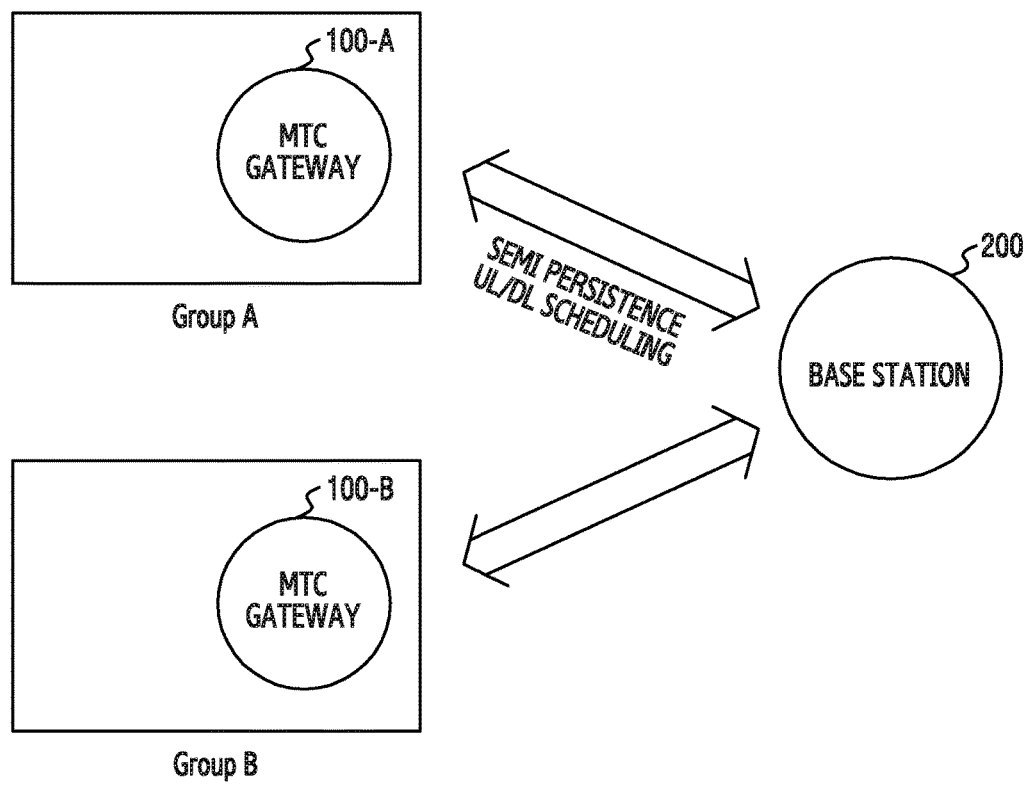
Figure 3C:
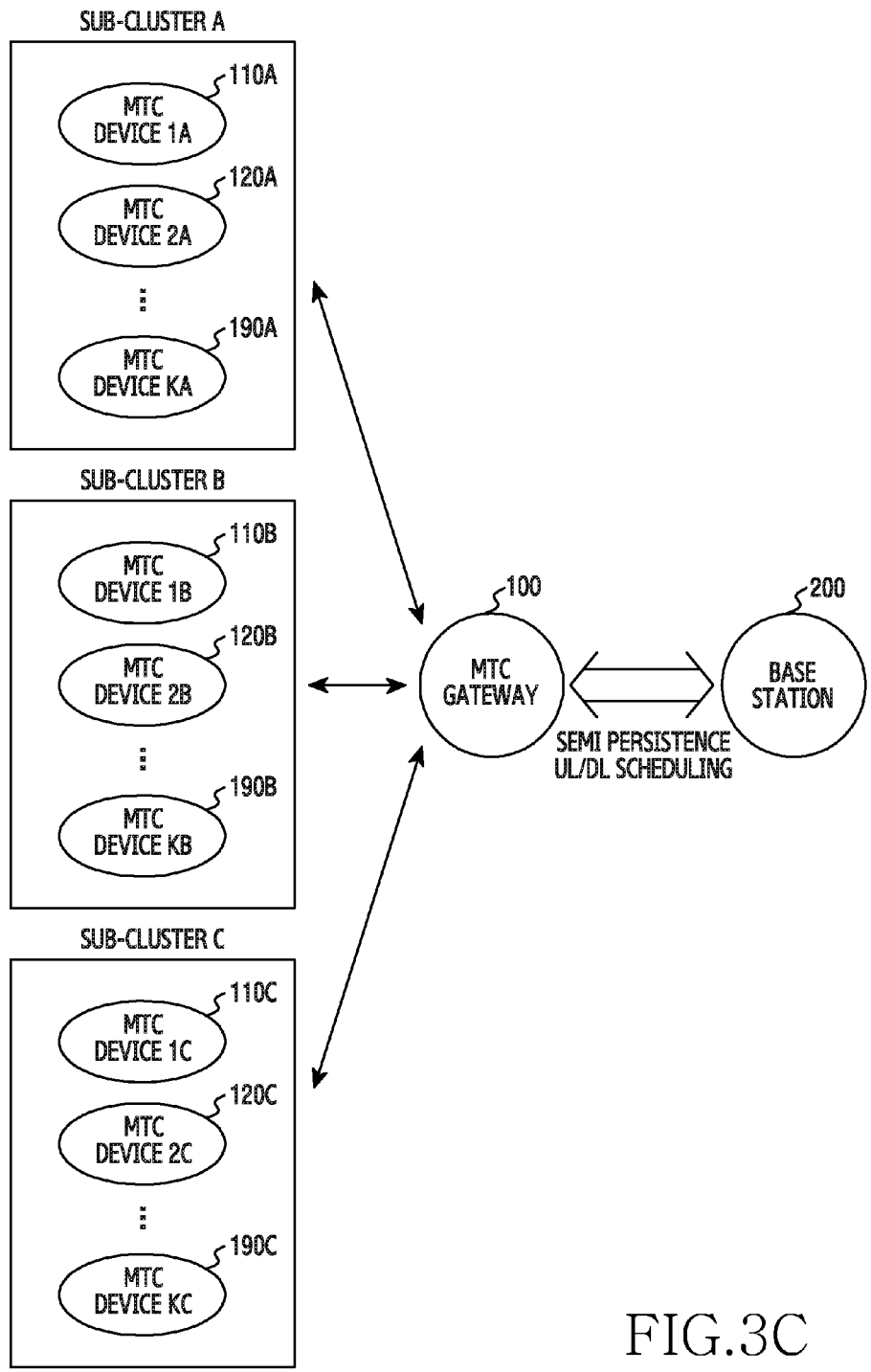

FIG. 3A to FIG. 3C are diagrams illustrating a configuration of a scheduling device by an MTC capillary network according to embodiments of the present disclosure.

Referring to FIG. 3A, the base station 200 performs a semi persistence UL/DL scheduling operation for the MTC devices 110-190 managed through the MTC gateway 100.

Referring to FIG. 3B, the base station 200 performs a semi persistence UL/DL scheduling operation for the MTC devices of group A managed through an MTC gateway 100-A and the MTC devices of group B managed through the MTC gateway 100-B.

Referring to FIG. 3C, the base station 200 performs a semi persistence UL/DL scheduling operation for the MTC devices of sub-clusters A, B, and C managed through the MTC gateway 100. MTC devices 110A-190A constitute sub-cluster A, MTC devices 110B-190B constitutes sub-cluster B, and MTC devices 110C-190C constitutes sub-cluster C. In an embodiment, homogeneous MTC devices may form a sub-cluster. In another embodiment, homogeneous MTC applications may form a sub-cluster when a plurality of applications driven in an identical MTC device are present.

Embodiments of the present disclosure propose a combination of dynamic scheduling, which is called Semi Persistence Scheduling (SPS), with continuous scheduling in order to support high Voice over Internet Protocol (VoIP) capacity having appropriate control signaling. The semi persistence scheduling includes continuous scheduling for initial transmission and dynamic scheduling for retransmission.

When embodiments of the present disclosure are based on an LTE system, a network activates semi persistence scheduling by using a Downlink Control Indicator (DCI) format in a Physical Downlink Common Control Channel (PDCCH).

Figure 4:
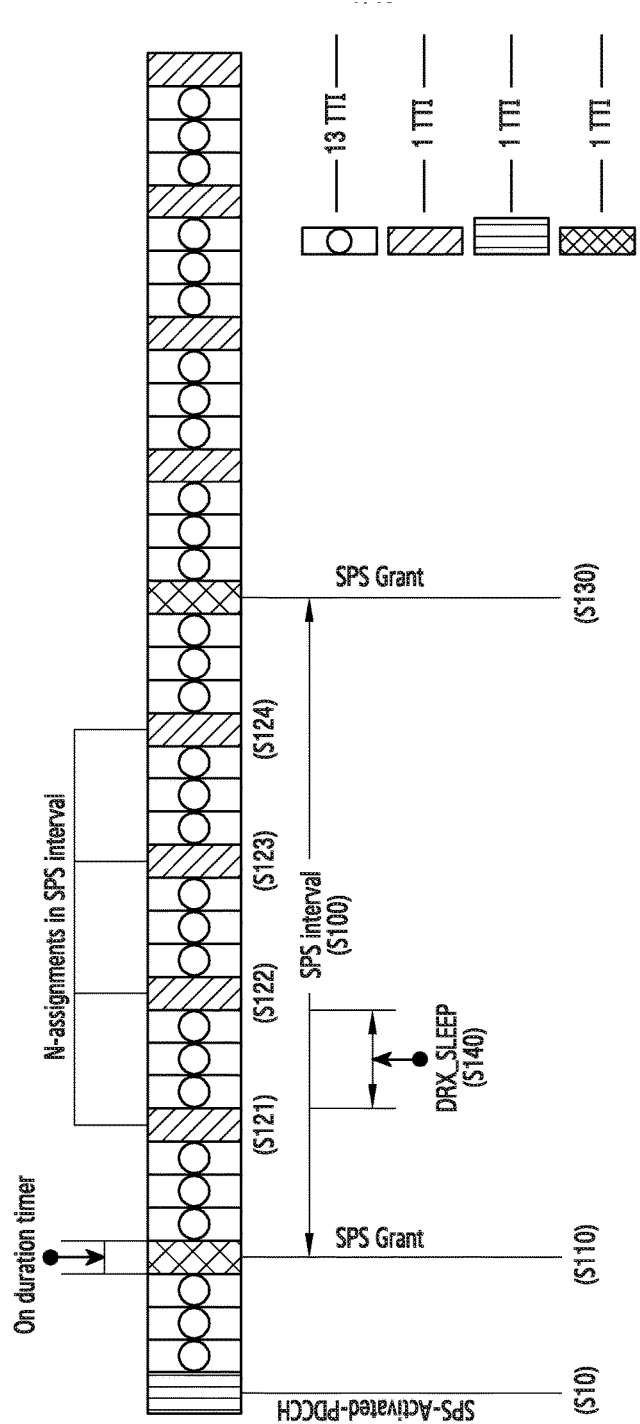
FIG. 4 is a diagram illustrating a semi persistence scheduling (SPS) operation according to embodiments of the present disclosure.

FIG. 4 is a diagram illustrating a semi persistence scheduling (SPS) operation according to embodiments of the present disclosure.

Referring to FIG. 4, the base station 200 predetermines an SPS interval S100 as a scheduling interval. A start interval S110 and an end interval S130 of the SPS interval S100 are intervals for SPS grant. Predefined N assignment intervals S121-S124 are included between the start interval S110 and the end interval S130 of the SPS interval S100. An end interval S130-AU of the SPS interval may be a start interval of the next SPS interval. The N assignment intervals S121-S124 are intervals for UL/DL resource allocation. An interval S10 before the start interval S110 of the SPS interval S100 is an interval in which a signal SPS-Activated-PDCCH notifying of SPS activation is transmitted. An interval between the assignment intervals S121 and S122 may form a DRX_Sleep interval.

Once SPS is activated, the base station 200 configures predefined DL/UL grant intervals S110 and S130 for the UE. The Dl/UL grant remains valid up to the SPS interval S100. The SPS interval S100 includes the assignment intervals S121-S124 for allocating N resources. The base station 200 may deactivate semi persistence scheduling by using DCI format-0 on a PDCCH having specific configuration information.

After semi persistence downlink allocation has been configured, the UE sequentially deems that an N-th assignment has occurred in a subframe according to the following EQUATION 1.

$$(10 \cdot \text{SFN} - \text{subframe}) = [(10 \cdot \text{SFN}_{start\ time} + \text{subframe}_{start\ time}) + N \cdot \text{semiPersistSchedIntervalDL}] \bmod 10240. \quad [\text{EQUATION 1}]$$

Here, SFN_starttime and subframe_starttime refer to an SFN and a subframe at a time point of (re) initialization of configured downlink allocation, respectively.

In addition, the UE sequentially deems that an N-th grant has occurred in a subframe according to the following EQUATION 2.

$$(10 \cdot \text{SFX} + \text{subframe}) = [(10 \cdot \text{SFN}_{start\ time} - \text{subframe}_{start\ time}) + X \cdot \text{semiPersistSchedIntervalUL} + \text{Subframe\_Offset} \cdot (N\ \text{module}\ 2)] \bmod 10240. \quad [\text{EQUATION 2}]$$

Here, SFN_starttime and subframe_starttime refer to an SFN and a subframe at a time point of (re) initialization of configured uplink grant, respectively.

Figure 5:
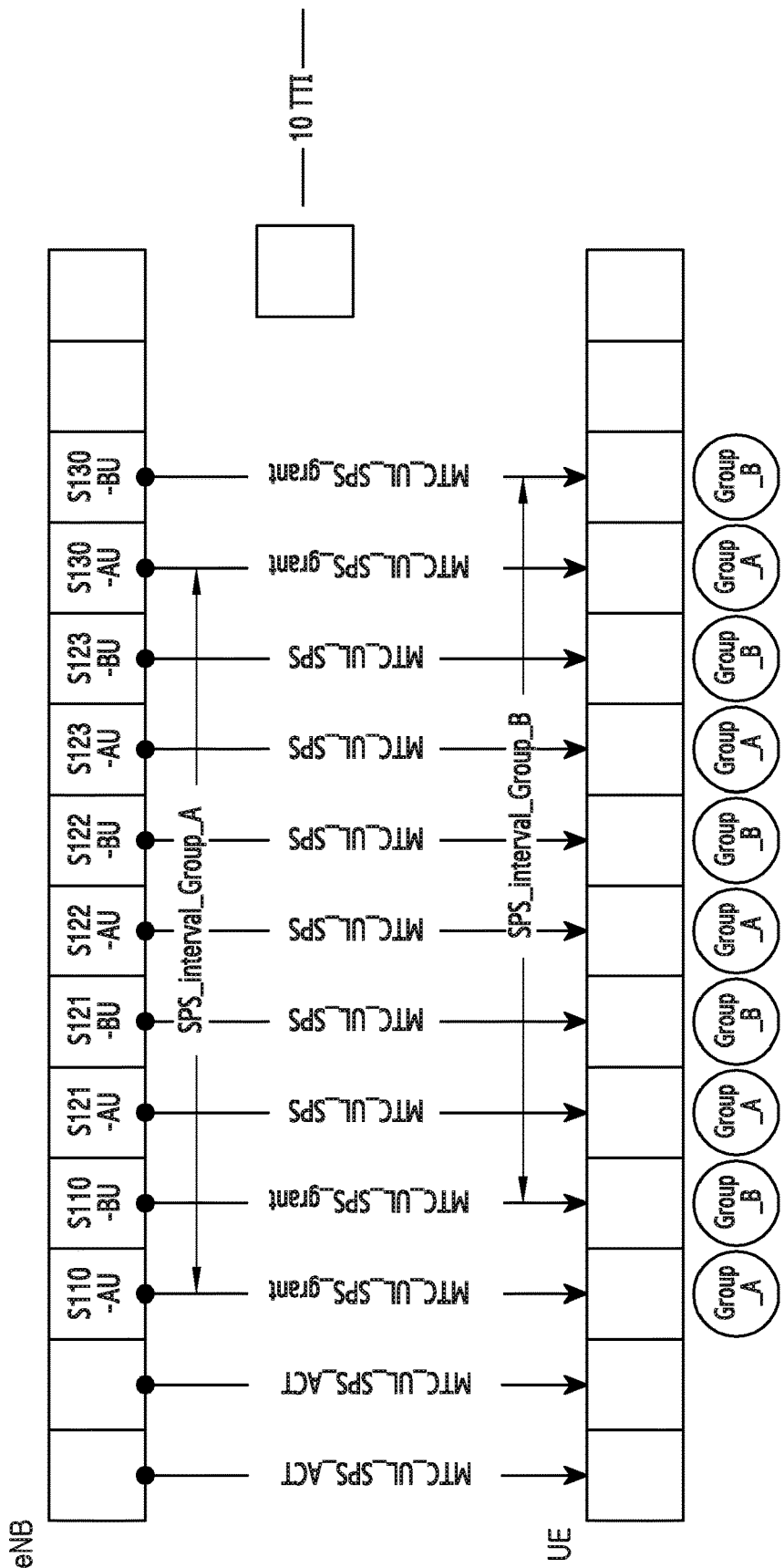
FIG. 5 is a diagram illustrating an uplink SPS assignment operation according to embodiments of the present disclosure.

FIG. 5 is a diagram illustrating an uplink SPS assignment operation according to embodiments of the present disclosure.

Referring to FIG. 5, when uplink SPS for group A is activated (MTC_UL_SPS-ACT), the base station performs grant and resource allocation assignment within the SPS interval. That is, the base station transmits a UL grant signal MTC_UL_SPS_grant in a start interval S110-AU of the SPS interval for group A, transmits a signal for resource allocation in assignment intervals S121-AU, S122-AU, and S123-AU, and then transmits the UL grant signal MTC_UL_SPS_grant in an end interval S130-AU of the SPS interval, to the UE. The end interval S130-AU of the SPS interval may be a start interval of the next SPS interval.

In addition, when uplink SPS for group B is activated (MTC_UL_SPS-ACT), the base station performs grant and resource allocation assignment within the SPS interval. That is, the base station transmits a UL grant signal MTC_UL_SPS_grant in a start interval S110-BU of the SPS interval for group B, transmits a signal for resource allocation in assignment intervals S121-BU, S122-BU, and S123-BU, and then transmits the UL grant signal MTC_UL_SPS_grant in an end interval S130-BU of the SPS interval, to the UE. The end interval S130-BU of the SPS interval may be a start interval of the next SPS interval.

Figure 6:
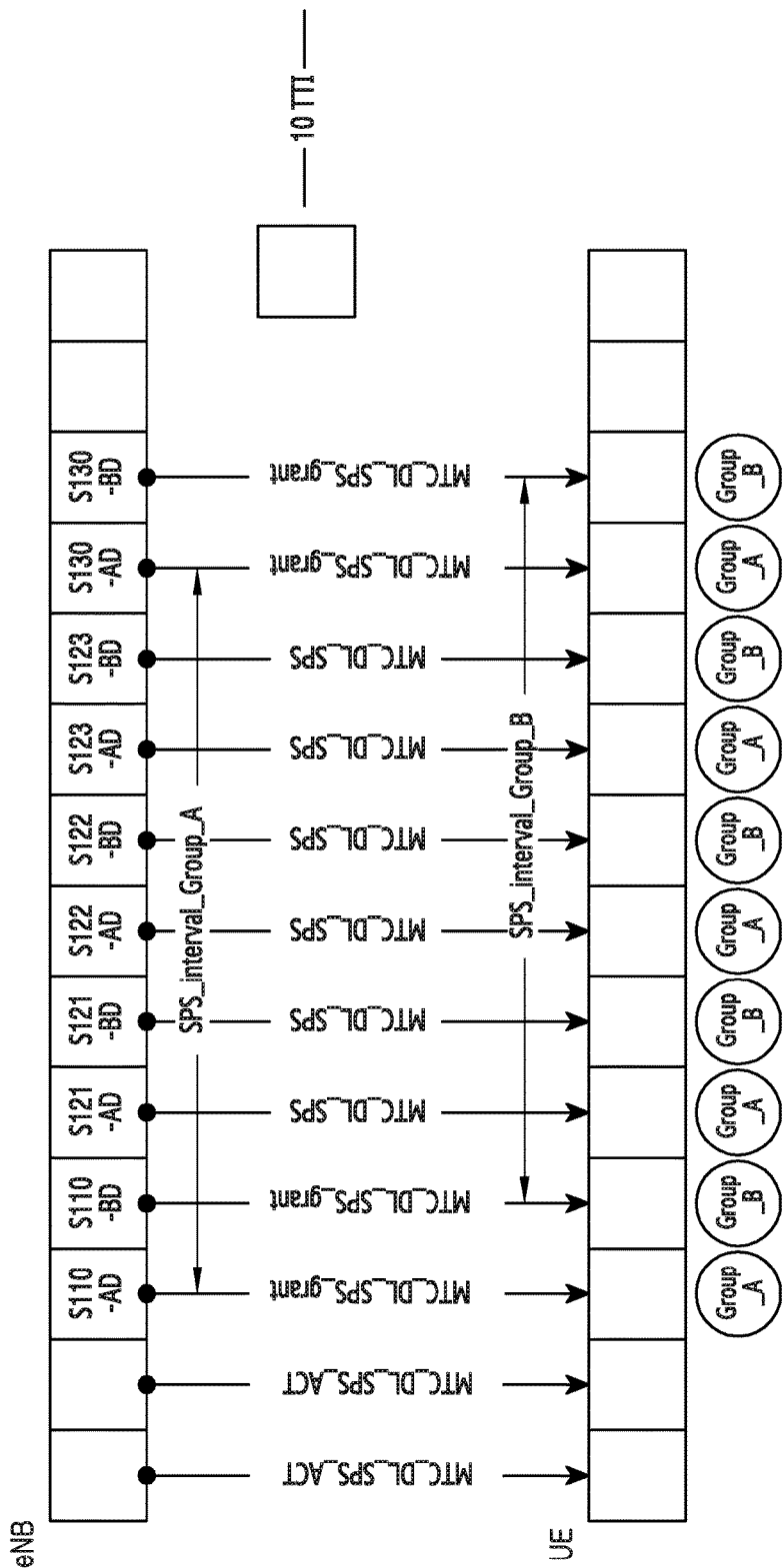
FIG. 6 is a diagram illustrating a downlink SPS assignment operation according to embodiments of the present disclosure.

FIG. 6 is a diagram illustrating a downlink SPS assignment operation according to embodiments of the present disclosure.

Referring to FIG. 6, when downlink SPS for group A is activated (MTC_DL_SPS-ACT), the base station performs grant and resource allocation assignment within the SPS interval. That is, the base station transmits a DL grant signal MTC_DL_SPS_grant in a start interval S110-AD of the SPS interval for group A, transmits a signal for resource allocation in assignment intervals S121-AD, S122-AD, and S123-AD, and then transmits the DL grant signal MTC_DL_SPS_grant in an end interval S130-AD of the SPS interval, to the UE. The end interval S130-AD of the SPS interval may be a start interval of the next SPS interval.

In addition, when SPS for group B is activated (MTC_DL_SPS-ACT), the base station performs grant and resource allocation assignment within the SPS interval. That is, the base station transmits a DL grant signal MTC_DL_SPS_grant in a start interval S110-BD of the SPS interval for group B, transmits a signal for resource allocation in assignment intervals S121-BD, S122-BD, and S123-BD, and then transmits the DL grant signal MTC_DL_SPS_grant in an end interval S130-BD of the SPS interval, to the UE. The end interval S130-BD of the SPS interval may be a start interval of the next SPS interval.

Referring to FIG. 3A to FIG. 3C again, the MTC gateway 100 is a leader node of the entire MTC capillary network, and all SPS allocations for UL/DL are allocated to the MTC gateway 100. In a case of each MTC capillary network, there exists one MTC gateway 100. The MTC gateway 100 is assigned to transmit DL/UL data for all MTC devices.

In relation to an MTC based operation, it is important to distribute the MTC devices in a time domain such that normal mobile communication is not interfered with the large number of predicted MTC devices. According to embodiments of the present disclosure, the MTC devices for the MTC gateway are grouped and the MTC gateway distributes SPS allocations for the MTC devices grouped to provide minimal influence on normal user communication.

Referring to FIG. 5 and FIG. 6, the base station activates SPS scheduling by transmitting specific configuration information (MTC_UL_SPS_ACT/MTC_DL_SPS_ACT) of DCI format 0 in a PDCCH, for each group formed by the MTC capillary network. Here, for convenience of description, it will be assumed that there are two groups having names of Group A and Group B. However, the number of groups formed by the MTC capillary network may be determined to be different, by available physical resources and capacity of a PDCCH.

Semi persistence scheduling is activated by transmitting, by the base station, MTC_DL_SPS_ACT or MTC_UL_SPS_ACT to the MTC gateway. When a plurality of MTC groups are present, semi persistence scheduling for each group is activated by transmitting, by the base station, MTC_DL_SPS_ACT or MTC_UL_SPS_ACT to the MTC gateway of each MTC group.

When semi persistence scheduling is activated, the MTC gateway receives a DL/UL grant signal (MTC_DL_SPS_grant, MTC_UL_SPS_grant) from the base station. For example, in a case of the base station in an LTE system, the MTC gateway receives, from the base station, a DL/UL grant signal (MTC_DL_SPS_grant, MTC_UL_SPS_grant) through a PDCCH. This DL/UL grant signal is a signal scrambled with SPS_C_RNTI that is identification information of the MTC gateway. Accordingly, the MTC gateway may receive the DL/UL grant signal transmitted thereto. Such grant may be available in N transmission time points (MTC_DL_SPS, MTC_UL_SPS) included in the SPS intervals. It is assumed that the SPS interval for each group has no limitation.

Semi persistence scheduling is deactivated by transmitting, by the base station, specific configuration information to the MTC gateway. For example, the base station may deactivate the MTC gateway by transmitting, to the MTC gateway, specific configuration information of DCI format-0 in a PDCCH according to a procedure defined in LTE-A.

Figure 7:
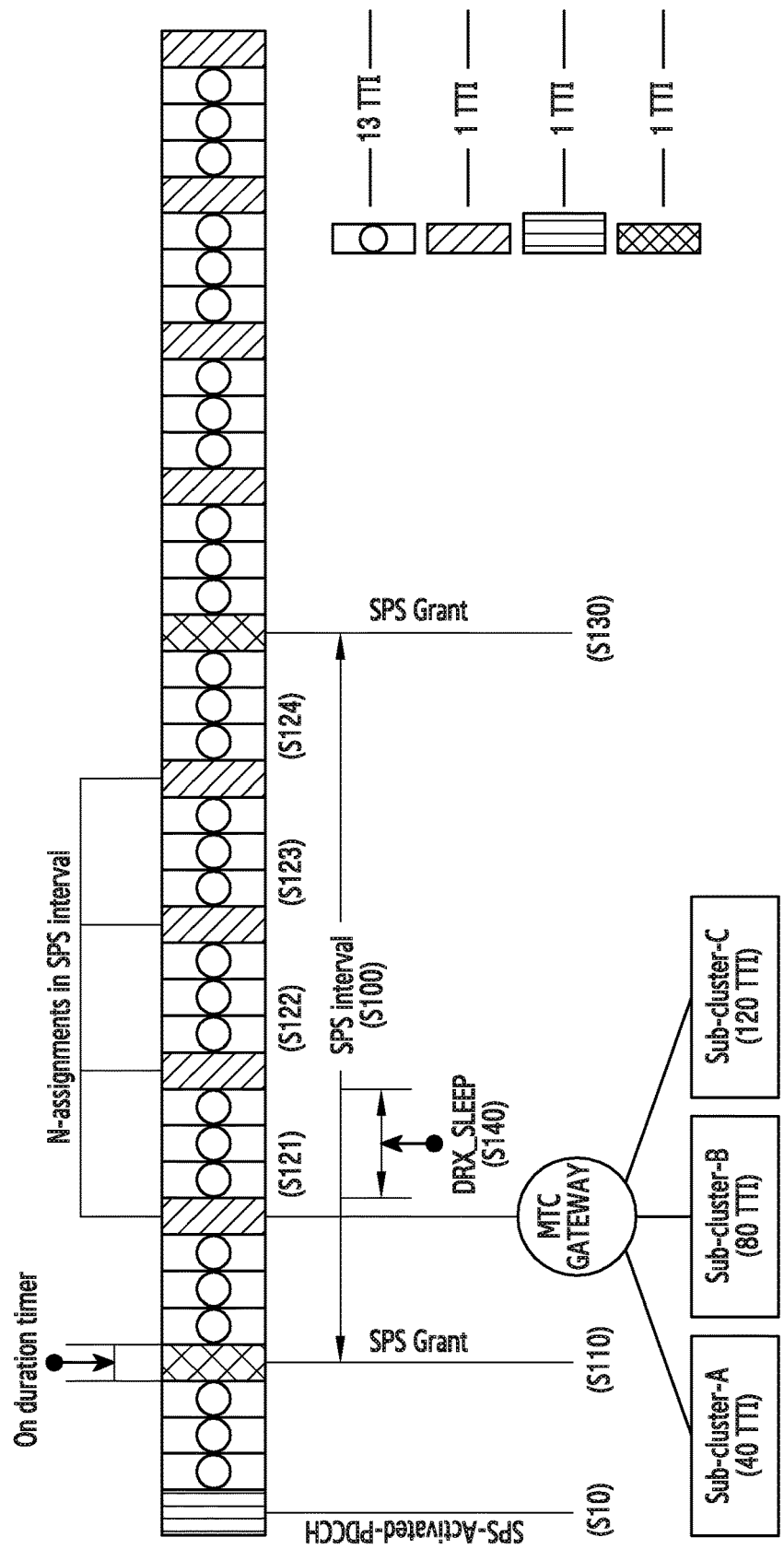
FIG. 7 is a diagram illustrating an SPS assignment operation for a group based on MTC devices of the same kind according to embodiments of the present disclosure.

FIG. 7 is a diagram illustrating an SPS assignment operation for a group based on MTC devices of the same kind according to embodiments of the present disclosure.

Referring to FIG. 7, SPS allocation having a large periodicity is available for the MTC gateway managing sub-cluster A, sub-cluster B, and sub-cluster C. That is, SPS allocation having the SPS interval S100 is available for the MTC gateway. UL/DL synchronization between a group managed by the MTC gateway and the base station is maintained within the SPS interval S100. SPS grant is transmitted to the start interval S110 and the end interval S130 of the SPS interval S100. The periodicity and the size of grant of the SPS interval S100 may be largely determined by the characteristic of the MTC application and the associated numbers of homogeneous/heterogeneous MTC devices. Delay tolerance, size of grant, and periodicity may be determined to be identical for homogeneous MTC devices within a group managed by the MTC gateway, while the same may be determined to be different for heterogeneous MTC devices.

Since sub-clusters are configured by homogeneous MTC devices, the UL/DL SPS allocation for the MTC gateway needs to be selected as scheduling interval MIN for all sub-clusters. Suppose that scheduling intervals required for all sub-clusters in the MTC capillary network are SC1, SC2, SC3, . . . , and SCN. Here, N is the number of sub-clusters in the capillary network. Then, MIN (SC1-SCN) may be selected as the SPS scheduling interval for the MTC gateway.

UL/DL grants S110 and S130 are assigned for homogeneous MTC devices and heterogeneous MTC devices in the MTC gateway. The base station provides GRANTs to the MTC gateway for respective homogeneous MTC devices and respective heterogeneous MTC devices, instead of providing GRANT for an individual MTC device.

Figure 8:
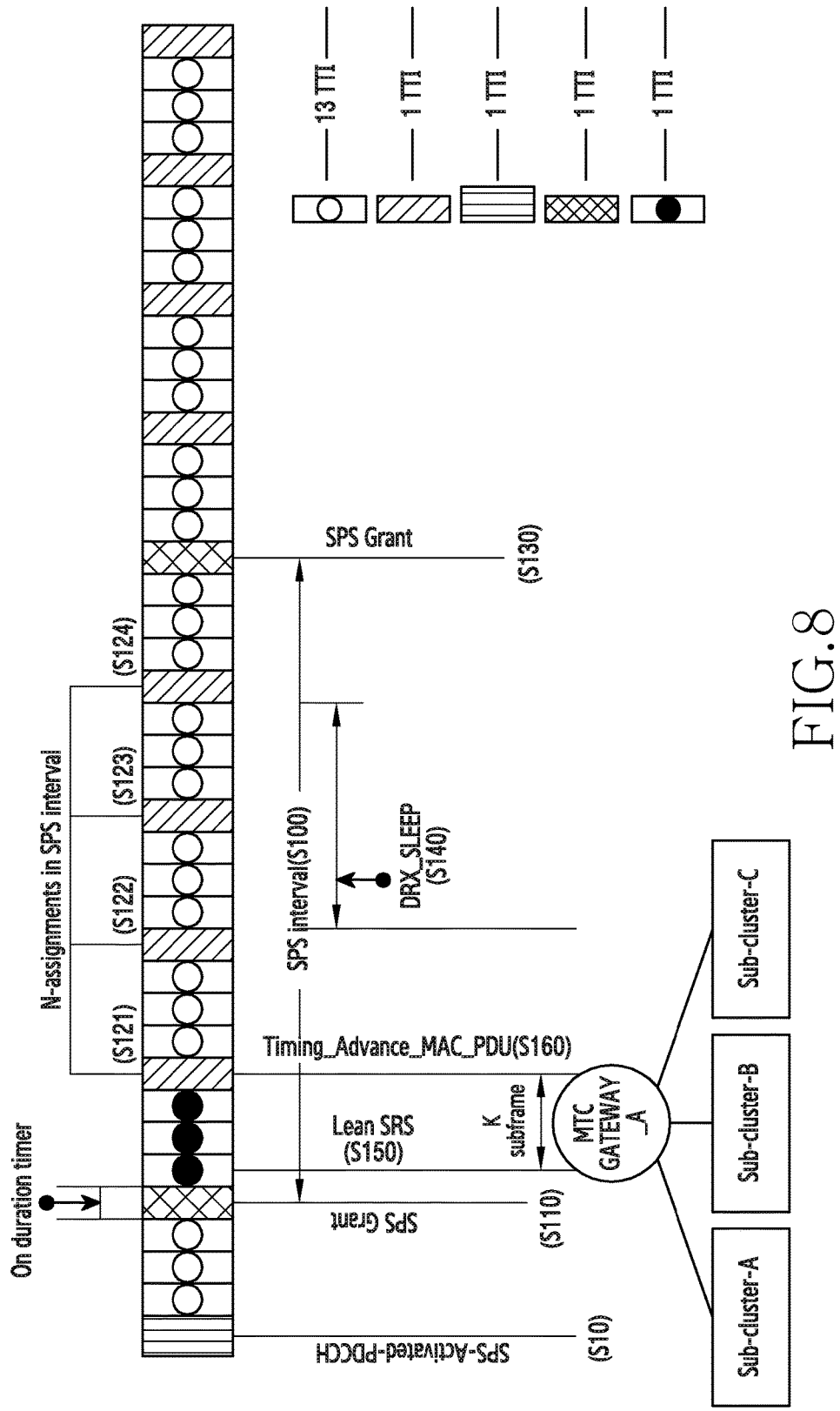
FIG. 8 is a diagram illustrating a timing advance procedure for an MTC group for maintaining uplink synchronization according to embodiments of the present disclosure.

FIG. 8 is a diagram illustrating a timing advance procedure for an MTC group for maintaining uplink synchronization according to embodiments of the present disclosure. The timing advance procedure is a procedure for uplink synchronization of devices within the MTC group. According to this procedure, the devices within the MTC group transmit an uplink signal ahead of a predetermined time according to TA information provided by the base station. This procedure may be performed for each MTC group.

Referring to FIG. 8, the MTC gateway maintains uplink synchronization with the base station. For example, the MTC gateway maintains uplink synchronization with the base station by a timing allocation procedure defined in 3GPP. A UL SPS scheduling interval S100 is predetermined. The MTC gateway transmits data through the uplink, only in N assignment intervals S121, S122, S123, and S124 within the UL SPS scheduling interval S100. However, an uplink signal is not transmitted in the remaining intervals. Accordingly, there is no method for calculating, by the network, timing advance for a specific MTC device (or UE). Therefore, it is required that the MTC device transmits the UL signal through the uplink in an interval based on a channel coherence time, and uplink synchronization is maintained according thereto.

The MTC gateway transmits a Lean SRS to the base station S150. This signal is a minimum uplink reference signal of a narrow bandwidth, and is used to measure timing advance in the uplink. The MTC devices are expected to be very static, and a timing advance interval may be thus configured to be sufficiently large. A time interval of the timing advance is closely related to the channel coherence time, but this does not correspond to the range of the present disclosure.

The MTC gateway receives timing advance information from the base station S160. In an embodiment, a timing advance MAC PDU as timing advance information is received through a PDSCH in the downlink after K subframes from transmission of the Lean SRS. The PDCCH is decoded by an MTC-RNTI using a standardized scheme.

In an embodiment, Lean SRS resources are configured by RRC reconfiguration, through semi persistence scheduling according to an LTE framework. The Lean SRS resources are allocated to the UE until RRC connection is terminated.

Since DL SPS occasion within the SPS interval is pre-configured, timing instances in which the UE receives a timing advance PDU may also be known. The UE transmits the Lean SRS in K subframes S150 before the DL_SPS resource assignment interval S121, so that the base station may process the Lean SRS and derive the timing advance to be transmitted to the UE.

The base station receives the Lean SRS from the MTC gateway, and calculates uplink timing advance. In an embodiment, the timing advance may be calculated by the base station in the same manner as that of the current LTE framework.

An interval of the timing advance may be appropriately configured in consideration of power efficiency of a lazy/snooze state operation. When the interval of the timing advance is increased based on mobility of the UE, the Lean SRS may be decreased in proportion thereto and, contrarily, when the interval of the timing advance is decreased, the Lean SRS may be increased in proportion thereto.

Figure 9:
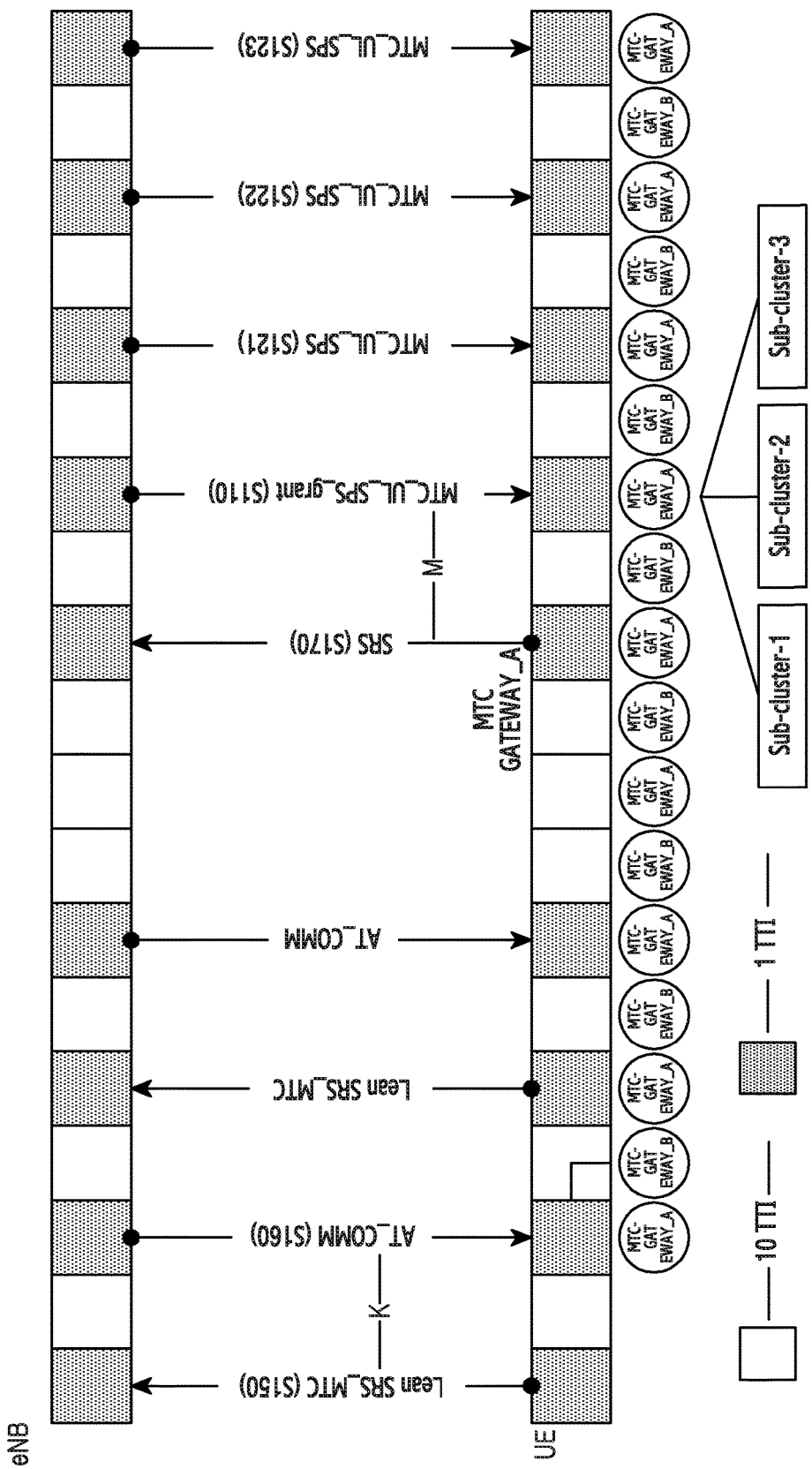
FIG. 9 is a diagram illustrating an uplink SPS synchronization and SPS approval operation for a group controlled by an MTC gateway according to embodiments of the present disclosure.

FIG. 9 is a diagram illustrating an uplink SPS synchronization and SPS approval operation for a group controlled by an MTC gateway according to embodiments of the present disclosure.

Referring to FIG. 9, UL SPS allocation and a scheduling interval thereof are known in advance. The base station needs to provide, as a UL SPS grant signal, UL channel allocation for a specific MTC gateway S110. To this end, the UE needs to awake at a predetermined time point (e.g., M subframes) S170 before the end of the SPS interval, and transmit SRSs. That is, the UE awakes at the predetermined time point before the end interval S110 of the SPS interval, which is an interval in which the signal MTC_UL_SPS_grant is transmitted, and transmits the SRSs.

The base station needs to know UL channel information before transmitting MTC_UL_SPS_Grant to the MTC gateway S110 in order to provide a service to all MTC devices under the management of MTC. When SPS is activated, the base station distributes MTC UL grants on the downlink to the MTC gateway through the PDCCH.

The base station performs triggering SRS transmission of the UE by transmitting command TA COMM to the UE via the PDCCH. Triggering of the SRS transmission is possible because the SPS UL grants are known in advance. The UE transmits SRSs in M sub-frames S170 before the end interval S110 of the SPS interval. The base station having received the SRSs from the UE allocates the UL grants according to channel state information based on the SRSs.

Figure 10:
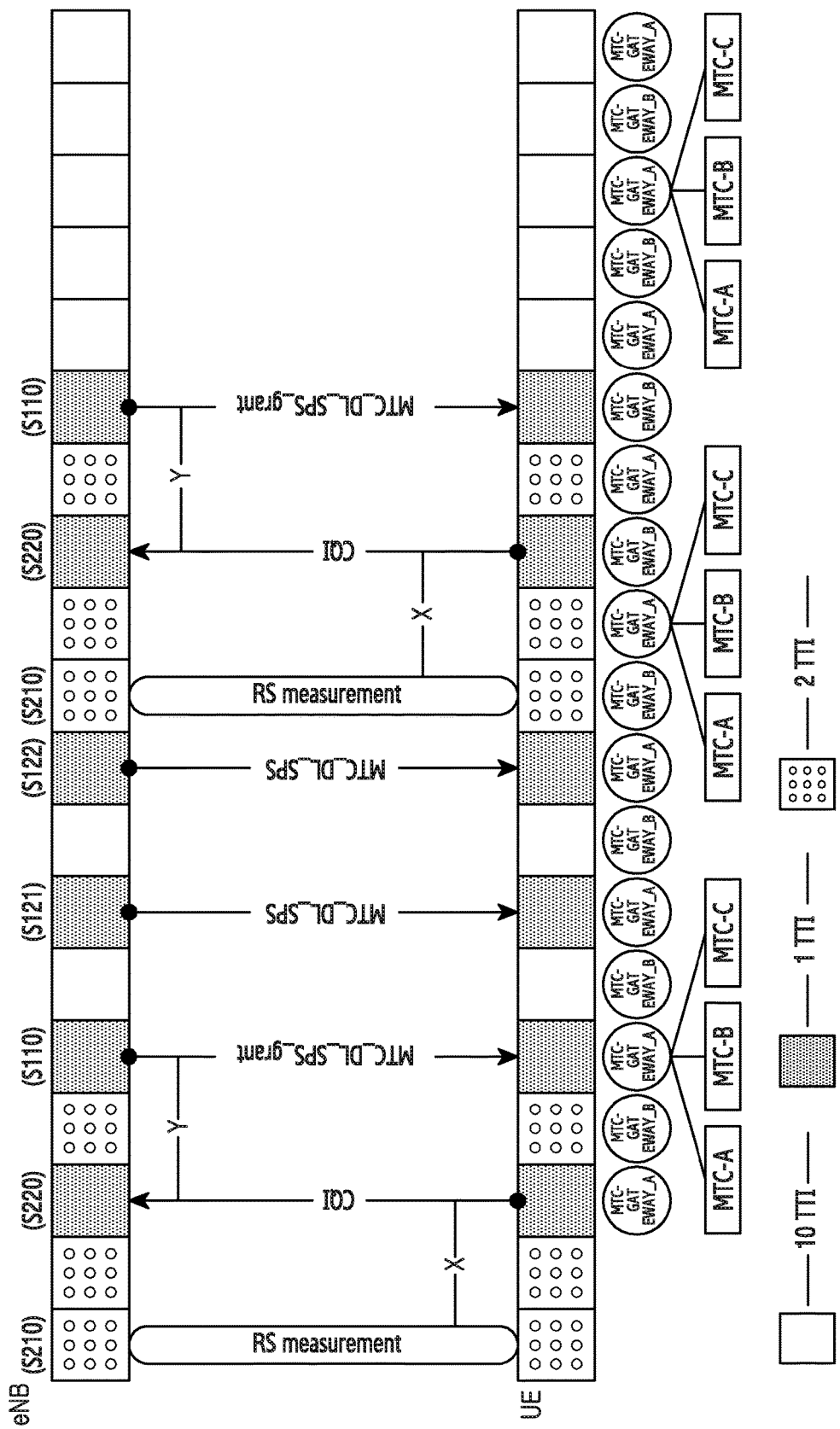
FIG. 10 is a diagram illustrating a downlink SPS approval and feedback operation for a group controlled by an MTC gateway according to embodiments of the present disclosure.

FIG. 10 is a diagram illustrating a downlink SPS approval and feedback operation for a group controlled by an MTC gateway according to embodiments of the present disclosure.

Referring to FIG. 10, a DL SPS scheduling interval is known in advance. The base station awaits a DL SPS interval and allocates physical resources to the MTC gateway in the DL SPS interval for all DL transmissions to the MTC devices. Accordingly, since the base station allocates physical resources to the MTC gateway only in the DL SPS interval, sleep operations in UEs may be optimized.

The MTC gateway may measure the channel quality of a reference signal in a subframe S210 which is (X+Y) subframes ahead of the end interval S110 of the DL SPS interval. For example, the MTC gateway measures an SINR of the reference signal. The MTC gateway transmits CQI indicating the channel quality measured in a subframe S220 which is Y subframes ahead of the end interval S110 of the DL SPS interval.

The base station transmits SPS grant MTC_DL_SPS_grant to the MTC gateway at a start time point S122 of the DL SPS interval. The identical SPS grant is continuously maintained for all N assignment intervals within the SPS interval.

Figure 11:
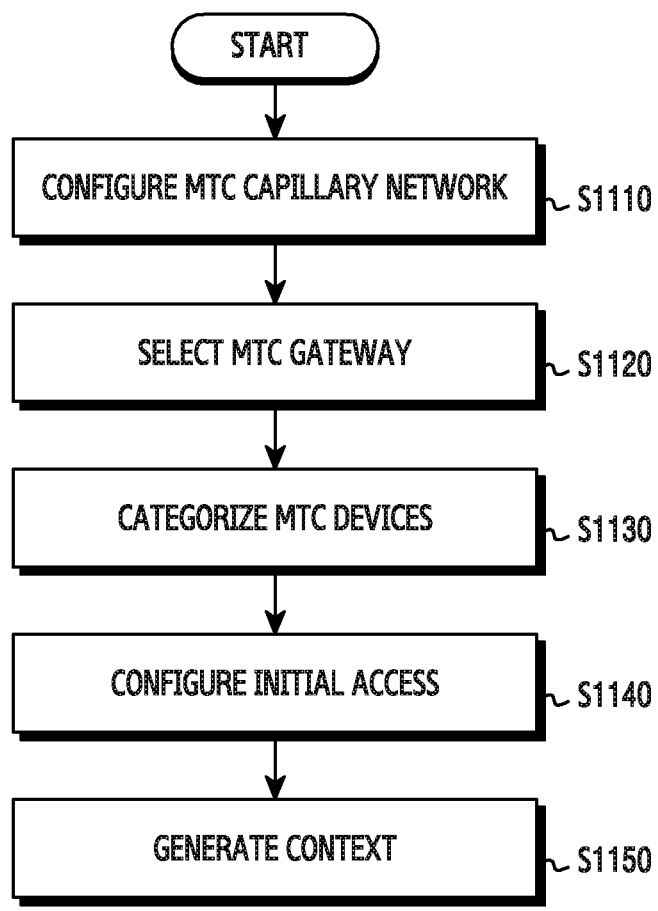
FIG. 11 is a diagram illustrating a processing flow for an MTC capillary network configuration according to embodiments of the present disclosure.

FIG. 11 is a diagram illustrating a processing flow for an MTC capillary network configuration according to embodiments of the present disclosure.

Referring to FIG. 11, an operation for MTC capillary network configuration starts in step S1110. One device among a plurality of MTC devices is selected as an MTC gateway, in step S1120. The MTC devices are categorized based on data characteristics in step S1130. For example, the data characteristics include delay tolerance, average grant, inter-packet interval, and the like. Initial access is configured in step S1140. A context for the MTC gateway is generated in step S1150. For example, the network is configured by Slow SPS, Lean SRS, SRS, and CQI with respect to the MTC gateway.

Figure 12:
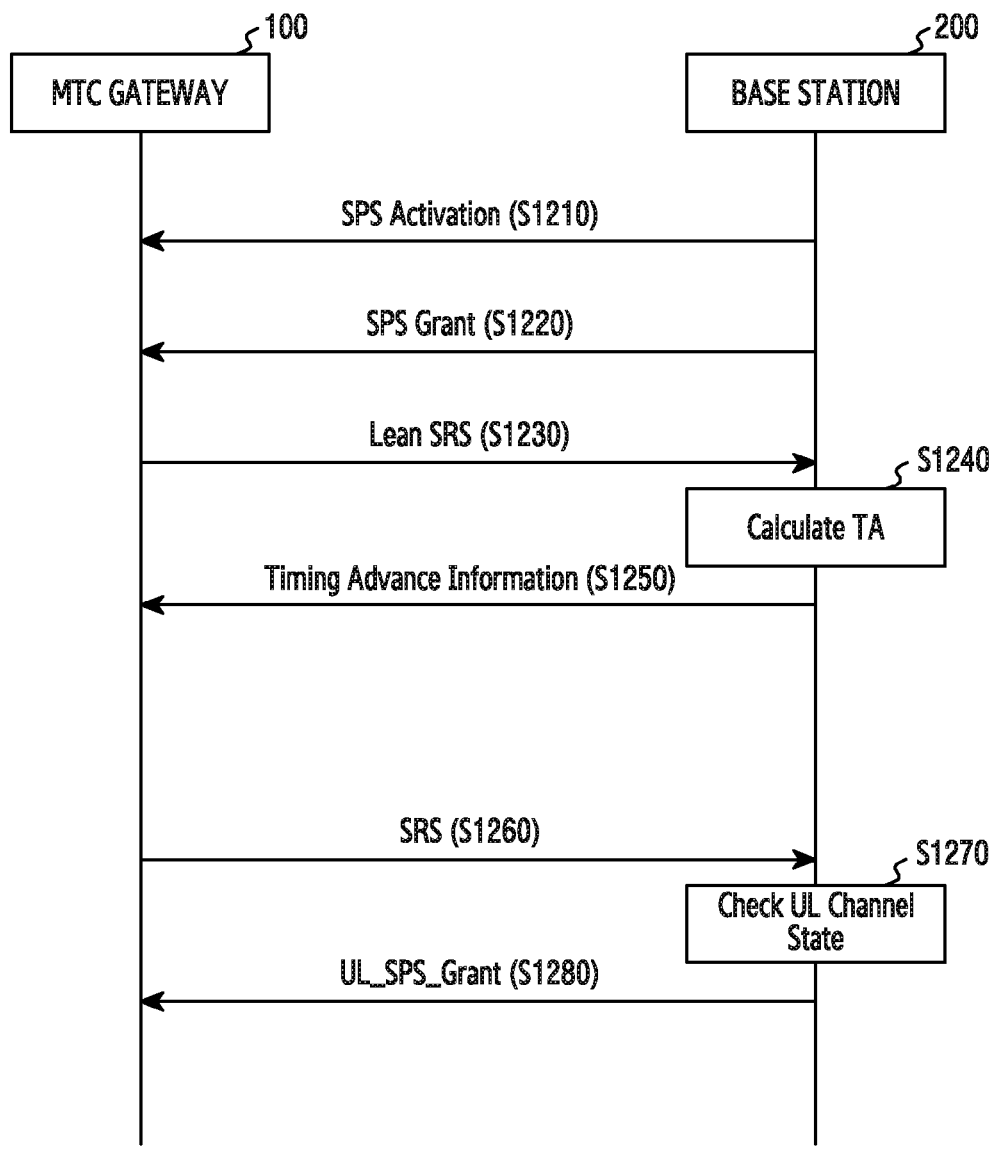
FIG. 12 is a diagram illustrating a processing flow of an uplink SPS synchronization and SPS approval operation performed between an MTC gateway and a base station according to embodiments of the present disclosure.

FIG. 12 is a diagram illustrating a processing flow of an uplink SPS synchronization and SPS approval operation performed between an MTC gateway and a base station according to embodiments of the present disclosure.

Referring to FIG. 12, the base station 200 transmits a signal for SPS activation to the MTC gateway 100, in step S1210. The base station 200 transmits SPS Grant to the MTC gateway 100, in step S1220. The MTC gateway 100 transmits a Lean SRS to the base station 200, in step 1230. The base station 200 calculates timing advance (TA) based on the received Lean SRS, in step S1240. The base station 200 transmits TA information to the MTC gateway 100, in step S1250.

Later, in step S1260, the base station 200 transmits an SRS to the MTC gateway 100. The base station 200 checks a UL channel state based on the received SRS, in step S1270. The base station 200 transmits UL_SPS_Grant to the MTC gateway 100 according to the checked UL channel state, in step S1280.

Figure 13:
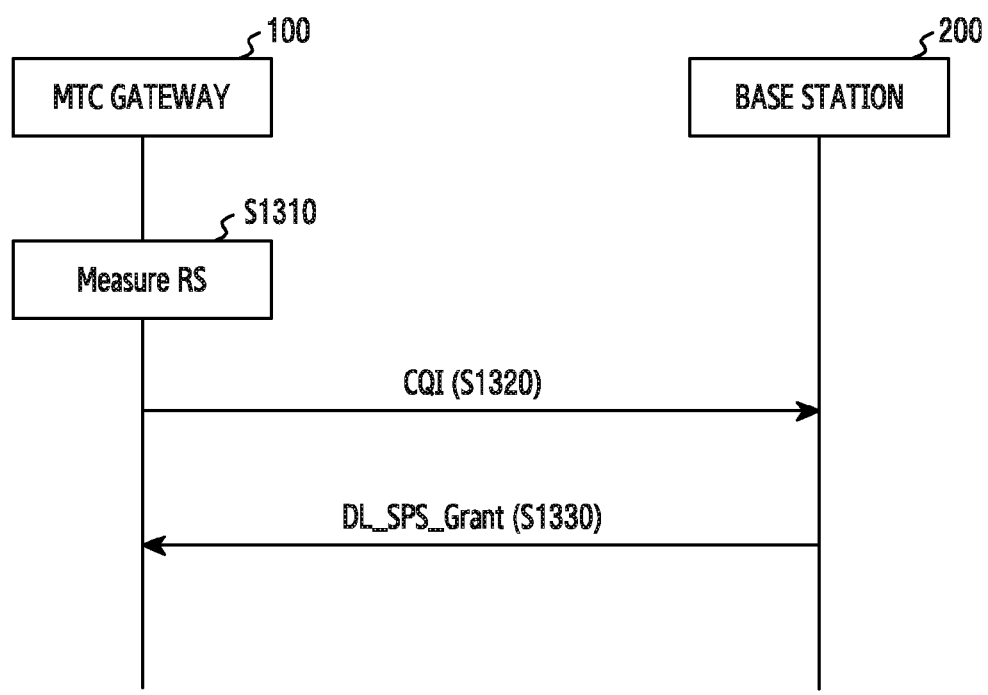
FIG. 13 is a diagram illustrating a processing flow of a downlink SPS approval and feedback operation performed between an MTC gateway and a base station according to embodiments of the present disclosure.

FIG. 13 is a diagram illustrating a processing flow of a downlink SPS approval and feedback operation performed between an MTC gateway and a base station according to embodiments of the present disclosure.

Referring to FIG. 13, the base station 200 measures an RS transmitted to the MTC gateway 100, in step S1310. The base station 200 receives, from the MTC gateway 100, CQI indicating channel quality information of the measured RS, in step S1320. The base station 200 checks a DL channel state according to the received CQI and transmits DL_SPS_Grant to the MTC gateway 100, in step S1330.

Figure 14:
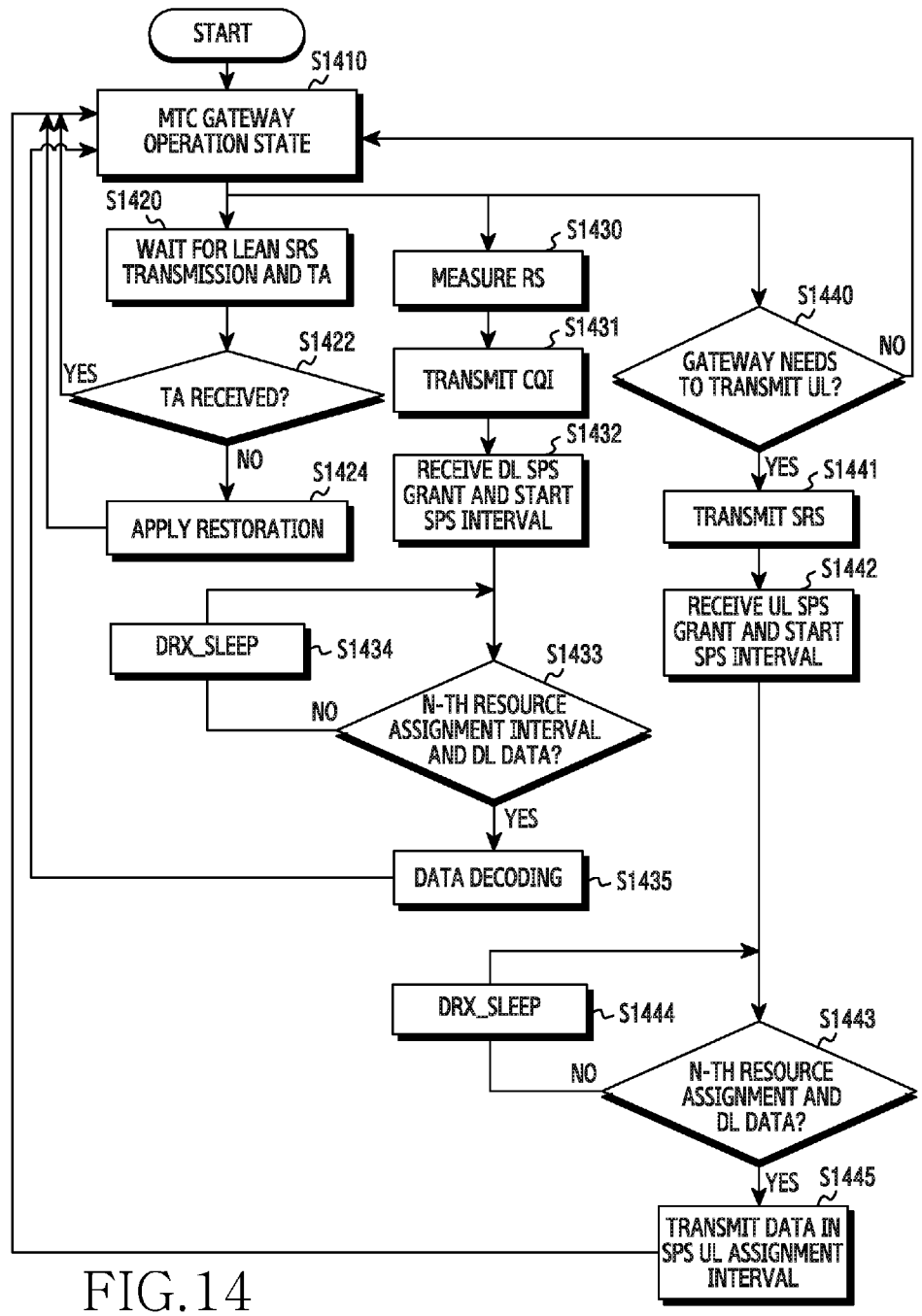
FIG. 14 is a diagram illustrating a processing flow by an MTC gateway according to embodiments of the present disclosure.

FIG. 14 is a diagram illustrating a processing flow by an MTC gateway according to embodiments of the present disclosure.

Referring to FIG. 14, in step S1410, the MTC gateway 100 combines (collates) data from MTC devices (or nodes) and maintains an operation state in which data for the MTC devices are distributed. For example, the MTC gateway 100 maintains a lazy/snooze state.

In step S1420, the MTC gateway 100 transmits the Lean SRS to the base station 200 and awaits TA information from the base station 200. The MTC gateway 100 determines whether the TA information is received, in step S1422. When the TA information is received, the MTC gateway 100 applies, in step S1424, the received TA information to a restoration operation for timing synchronization.

The MTC gateway 100 measures the RS received from the base station 200, in step S1430. The MTC gateway 100 transmits, to the base station 200, CQI according to a received result of measuring the RS, in step S1431. In step S1432, the MTC gateway 100 receives DL SPS Grant transmitted from the base station 200, and starts an SPS interval. In step S1433, the MTC gateway 100 determines whether or not an N-th resource assignment interval within the SPS interval and DL data is received. When the DL data is not received, the MTC gateway 100 performs a DRX_Sleep operation, in step S1434. When the DL data is received, the MTC gateway 100 decodes the received data, in step S1435.

The MTC gateway 100 determines whether UL transmission is needed, in step S1440. When the UL transmission is needed, the MTC gateway 100 transmits SRS to the base station 200 in step S1441.

In step S1442, the MTC gateway 100 receives UL SPS Grant, and starts the SPS interval. In step S1443, the MTC gateway 100 determines whether or not an N-th resource assignment interval within the SPS interval, and DL data is received. When the DL data is not received, the MTC gateway 100 performs a DRX_Sleep operation, in step S1444. When the DL data is received, the MTC gateway 100 transmits data in a UL assignment interval in step S1445.

Figure 15:
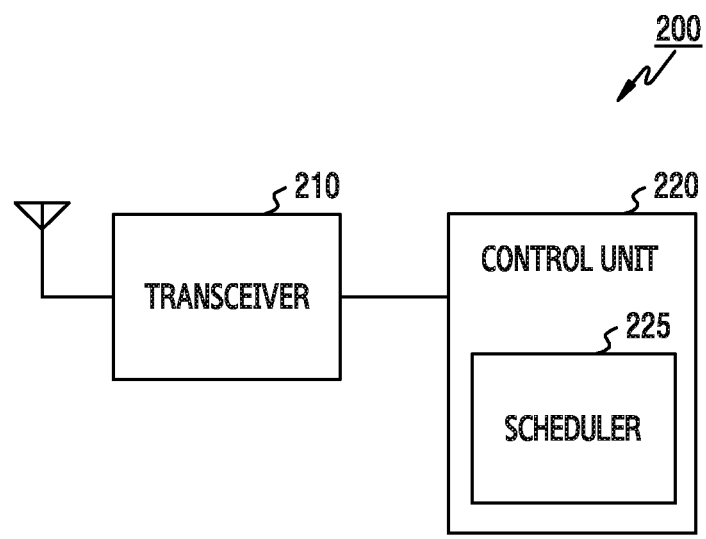
FIG. 15 is a diagram illustrating a configuration of a base station device according to embodiments of the present disclosure.

FIG. 15 is a diagram illustrating a configuration of a base station device according to embodiments of the present disclosure.

Referring to FIG. 15, the base station 200 includes a transceiver 210 and a control unit 220. The transceiver 210 is to transmit or receive a signal between the base station 200 and different entities. For example, the transceiver 210 transmits or receives a signal between the base station 200 and the MTC gateway 100. The control unit 220 controls a general operation of the base station 200. The control unit 220 includes a scheduler 225, and controls SPS scheduling operations according to embodiments of the present disclosure. For example, the control unit 220 controls operations according to flows as illustrated in FIG. 4 to FIG. 14.

In an embodiment, the control unit 220 transmits, to a leader device (MTC gateway), a downlink control signal through the transceiver 210 in at least one assignment interval within a scheduling interval. In addition, the control unit 220 receives an uplink signal from the leader device through the transceiver 210 at a specific time point determined from the assignment interval within the scheduling interval.

In an embodiment, the control unit 220 transmits, to the leader device, a downlink grant signal in a start interval and an end interval of the scheduling interval. The at least one assignment interval includes the remaining intervals of the scheduling interval except the start interval and the end interval.

In an embodiment, the control unit 220 transmits, to the leader device, information indicating scheduling activation before the scheduling interval.

In an embodiment, the control unit 220 receives, from the leader device, a reference signal in a predetermined interval before the at least one assignment interval, calculates timing information in response to the reference signal, and transmits, to the leader device, the calculated timing information in the at least one assignment interval.

In an embodiment, the control unit 220 receives, from the leader device, a reference signal in a predetermined interval before an end interval of the scheduling interval, and transmits, to the leader device, a grant signal for uplink channel allocation in response to the reference signal in the end interval of the scheduling interval.

In an embodiment, the control unit 220 receives, from the leader device, downlink channel quality information in a predetermined interval before a start interval of the scheduling interval, and transmits, to the leader device, a downlink grant signal in response to the downlink channel quality information in the start interval of the scheduling interval.

In an embodiment, the leader device includes a device selected among a plurality of devices having homogeneous characteristics, based on at least one of a reception signal strength, a power source, and mobility. The plurality of devices include devices having the same characteristics in at least one aspect of service quality, delay tolerance, and uplink/downlink grant. The plurality of devices include different applications operating in different devices or in the same device.

Figure 16:
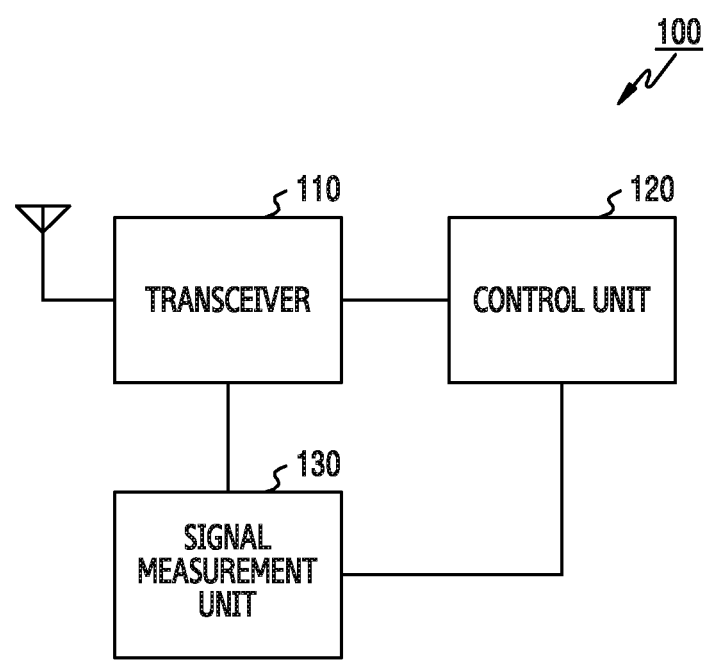
FIG. 16 is a diagram illustrating a configuration of an MTC gateway according to embodiments of the present disclosure.

FIG. 16 is a diagram illustrating a configuration of an MTC gateway according to embodiments of the present disclosure.

Referring to FIG. 16, the MTC gateway 100 includes a transceiver 110, a control unit 120, and a signal measurement unit 130. The transceiver 110 is to transmit or receive a signal between the MTC gateway 100 and other entities. For example, the transceiver 110 transmits or receives a signal between the MTC gateway 100 and base station 200. The control 120 controls a general operation of the MTC gateway 100. For example, the control unit 120 controls operations according to flows as illustrated in FIG. 4 to FIG. 14. The signal measurement unit 130 measures a signal received through the transceiver 110. For example, the signal measurement unit 130 measures an RS received from the base station 200.

In an embodiment, the control unit 120 receives, from the base station 200, a downlink control signal through the transceiver 110 in the at least one assignment interval within the scheduling interval. In addition, the control unit 120 transmits, to the base station 200, an uplink signal through the transceiver 110 at a specific time point determined from the at least one assignment interval within the scheduling interval.

In an embodiment, the control unit 120 receives, from the base station 200, a downlink grant signal in a start interval and an end interval of the scheduling interval. In an embodiment, the at least one assignment interval includes the remaining intervals of the scheduling interval except the start interval and the end interval.

In an embodiment, the control unit 120 receives, from the base station 200, information indicating activation of scheduling before the scheduling interval.

In an embodiment, the control unit 120 transmits, to the base station 200, a reference signal in a predetermined interval before the at least one assignment interval, and receives, from the base station 200, timing information responding to the reference signal in the at least one assignment interval.

In an embodiment, the control unit 120 transmits, to the base station 200, a reference signal in a predetermined interval before an end interval of the scheduling interval, and receives, from the base station 200, a grant signal for uplink channel allocation in response to the reference signal in the end interval of the scheduling interval.

In an embodiment, the signal measurement unit 130 measures a downlink channel quality in a predetermined first interval before a start interval of the scheduling interval. The control 120 transmits, to the base station 200, information of the measured downlink channel quality, in a predetermined second interval before the start interval of the scheduling interval, and receives, from the base station 200, a downlink grant signal responding to the information of the downlink channel quality in the start interval of the scheduling interval.

In an embodiment, the leader device includes a device selected among a plurality of devices having homogeneous characteristics, based on at least one of a reception signal strength, a power source, and mobility. The plurality of devices include devices having the same characteristics in at least one aspect of service quality, delay tolerance, and uplink/downlink grant. The plurality of devices include different applications operating in different devices or in the same device.

As described above, according to embodiments of the present disclosure, a base station of a mobile communication network for MTC and one leader device (or an MTC gateway) among a plurality of devices may be able to minimize the overhead of signal transmission or reception by transmitting or receiving a signal only at a specific time point, and may also be able to minimize power consumption in the devices.

Although the present disclosure has been described by the restricted embodiments and the drawings as described above, the present disclosure is not limited to the aforementioned embodiments, and various modifications and alterations can be made from the descriptions by those skilled in the art to which the present disclosure pertains. The operations according to embodiments of the present disclosure may be implemented by a single processor. In this case, program instructions for performing various computer-implemented operations may be stored in a computer-readable medium. The computer readable medium may include a program command, a data file, a data structure, and the like independently or in combination. The program command may be things specially designed and configured for the present disclosure, or things that are well known to, and can be used by, those skilled in the related art. For example, the computer readable recoding medium includes magnetic media such as a hard disk, a floppy disk, and a magnetic tape, optical media such as a CD-ROM and a DVD, magneto-optical media such as a floptical disk, and hardware devices such as a ROM, RAM, and a flash memory, which are specially constructed in such a manner that they can store and execute a program command Examples of the program command include a machine language code generated by a compiler and a high-level language code executable by a computer through an interpreter and the like. When all or some of the base stations or relays as described in the present disclosure are implemented by a computer program, a computer-readable recording medium in which the computer program is stored also falls within the scope of the present disclosure. Therefore, the scope of the present disclosure should not be defined as being limited to the embodiments, but should be defined by the appended claims and equivalents thereof.

The invention claimed is:

1. A method performed by a base station in a mobile communication network for machine type communication (MTC), the method comprising:
transmitting, through a transceiver, downlink control signals to a leader device among a plurality of devices for MTC, in order to indicate a scheduling interval, wherein the scheduling interval includes at least one assignment interval;
receiving, from the leader device, a reference signal after a first downlink control signal and in a predetermined interval before the first assignment interval within the scheduling interval;
determining timing information in response to the reference signal;
transmitting the determined timing information to the leader device before the first assignment interval within the scheduling interval; and
receiving an uplink signal from the leader device at a specific time point determined from the at least one assignment interval within the scheduling interval.

2. The method of claim 1, further comprising:
transmitting, to the leader device, the first downlink control signal indicating start of the scheduling interval and a second downlink control signal indicating end of the scheduling interval.

3. The method of claim 2, further comprising:
receiving, from the leader device, a reference signal in a predetermined interval before the start of the scheduling interval; and
transmitting, to the leader device, a grant signal for uplink channel allocation in response to the reference signal in the start of the scheduling interval.

4. The method of claim 2, further comprising:
receiving, from the leader device, downlink channel quality information in a predetermined interval before the start of the scheduling interval; and
transmitting, to the leader device, a downlink grant signal in response to the downlink channel quality information in the start of the scheduling interval.

5. The method of claim 1, further comprising:
transmitting, to the leader device, information indicating activation of scheduling before the scheduling interval.

6. The method of claim 1, wherein the leader device comprises a device selected among the plurality of devices having a homogeneous characteristic, based on at least one of a reception signal strength, a power source, or mobility.

7. A device among a plurality of devices in a mobile communication network for machine type communication (MTC), the device comprising:
a transceiver configured to:
receive downlink control signals from a base station indicating a scheduling interval, wherein the scheduling interval includes at least one assignment interval,
transmit, to the base station, a reference signal after a first downlink control signal and in a predetermined interval before the first assignment interval within the scheduling interval,
receive, from the base station, a timing information determined by the base station in response to the reference signal before the first assignment interval within the scheduling interval, and
transmit an uplink signal to the base station at a specific time point determined from the at least one assignment interval within the scheduling interval.

8. The device of claim 7, wherein the transceiver is further configured to:
receive the first downlink control signal indicating start of the scheduling interval and a second downlink control signal indicating end of the scheduling interval.

9. The device of claim 8, wherein the transceiver is further configured to:
transmit a reference signal to the base station in a predetermined interval before the start of the scheduling interval, and receive, from the base station, a grant signal for uplink channel allocation in response to the reference signal in the start of the scheduling interval.

10. The device of claim 8, further comprising:
at least one processor configured to measure a downlink channel quality in a predetermined first interval before the start of the scheduling interval,
wherein the transceiver is further configured to:
transmit, to the base station, information of the measured downlink channel quality, in a predetermined second interval before the start of the scheduling interval, and
receive, from the base station, a downlink grant signal responding to information of the measured downlink channel quality, in the start of the scheduling interval.

11. The device of claim 7, wherein the transceiver is further configured to receive, from the base station, information indicating activation of scheduling before the scheduling interval.

12. A base station in a mobile communication network for machine type communication (MTC), the base station comprising:
a transceiver configured to:
transmit downlink control signals to a leader device among a plurality of devices for MTC, in order to indicate a scheduling interval, wherein the scheduling interval includes at least one assignment interval,
receive, from the leader device, a reference signal after a first downlink control signal and in a predetermined interval before the first assignment interval within the scheduling interval,
determine timing information in response to the reference signal,
transmit the determined timing information to the leader device before the first assignment interval within the scheduling interval, and
receive an uplink signal from the leader device at a specific time point determined from the at least one assignment interval within the scheduling interval.

13. The base station of claim 12,
wherein the transceiver is further configured to transmit, to the leader device, the first downlink control signal indicating start of the scheduling interval and a second downlink control signal indicating end of the scheduling interval.

14. The base station of claim 13, wherein the transceiver is further configured to:
receive, from the leader device, a reference signal in a predetermined interval before the start of the scheduling interval, and
transmit, to the leader device, a grant signal for uplink channel allocation in response to the reference signal in the start of the scheduling interval.

15. The base station of claim 13, wherein the transceiver is further configured to:
receive, from the leader device, downlink channel quality information in a predetermined interval before the start of the scheduling interval, and
transmit, to the leader device, a downlink grant signal in response to the downlink channel quality information in the start of the scheduling interval.

16. The base station of claim 12, wherein the transceiver is further configured to transmit, to the leader device, information indicating activation of scheduling before the scheduling interval.

17. The base station of claim 12, wherein the leader device comprises a device selected among the plurality of devices having a homogeneous characteristic, based on at least one of a reception signal strength, a power source, or mobility.

* * * * *